United States Patent
Baird

(10) Patent No.: US 7,257,689 B1
(45) Date of Patent: Aug. 14, 2007

(54) SYSTEM AND METHOD FOR LOOSELY COUPLED TEMPORAL STORAGE MANAGEMENT

(75) Inventor: Robert Baird, San Jose, CA (US)

(73) Assignee: VERITAS Operating Corporation, Cupertino, CA (US)

( * ) Notice: Subject to any disclaimer, the term of this patent is extended or adjusted under 35 U.S.C. 154(b) by 343 days.

(21) Appl. No.: 10/966,791

(22) Filed: Oct. 15, 2004

(51) Int. Cl.
*G06F 12/16* (2006.01)
*G06F 17/30* (2006.01)
*G06F 17/40* (2006.01)

(52) U.S. Cl. .................. 711/162; 707/201; 707/204

(58) Field of Classification Search ............. 707/201, 707/204; 711/162
See application file for complete search history.

(56) References Cited

U.S. PATENT DOCUMENTS

| | | | |
|---|---|---|---|
| 5,261,088 | A | 11/1993 | Baird et al. |
| 6,128,630 | A | 10/2000 | Shackelford |
| 6,651,075 | B1 | 11/2003 | Kusters et al. |
| 6,694,323 | B2 | 2/2004 | Bumbulis |
| 6,732,125 | B1 | 5/2004 | Autrey et al. |
| 6,792,432 | B1 | 9/2004 | Kodavalla |
| 2005/0071379 | A1 | 3/2005 | Kekre et al. |

OTHER PUBLICATIONS

Rosenblum, et al, "The Design and Implementation of a Log-Structured File System", *Proceedings of the Thirteenth ACM Symposium on Operating System Principles*, Pacific Grove, CA, Oct. 13-16, 1991.

Sullivan, et al, "An Index Implementation Supporting Fast Recovery for the POSTGRES Storage System", *Proceedings of the Eighth International Conference on Data Engineering*, Tempe, AZ, Feb. 3-7, 1992.

"A Guide To Understanding VERITAS Volume Replicator™," White Paper, VERITAS, p. 1-15, 2002.

Senicka, J., "A Guide To Implementing Cost Effective High Availability Techniques Using VERITAS Cluster Server," White Paper, VERITAS, p. 1-8, Aug. 2004.

Chamberlin, et al., "A History and Evaluation of System R," Communications of the ACM, vol. 24, No. 10, p. 632-646, Oct. 1981.

"VERITAS Storage Foundation™, Technical Overview," VERITAS, pp. i-32, Apr. 2002.

*Primary Examiner*—Jack A. Lane
(74) *Attorney, Agent, or Firm*—Meyertons Hood Kivlin Kowert & Goetzel, P.C.; B. Noël Kivlin

(57) ABSTRACT

A system for loosely coupled temporal storage management includes a logical storage aggregation including a plurality of data blocks, a data producer, one or more data consumers, and a temporal storage manager. The temporal storage manager may be configured to maintain a producer shadow store including entries stored in a log-structured logical volume, where each entry is indicative of one or more data blocks of the logical storage aggregation that have been modified by the data producer. The temporal storage manager may also be configured to maintain a repository containing a baseline version of the logical storage aggregation, and to provide the data consumers with read-only access to the producer shadow store and the repository.

33 Claims, 15 Drawing Sheets

SYSTEM AND METHOD FOR LOOSELY COUPLED TEMPORAL STORAGE MANAGEMENT

BACKGROUND OF THE INVENTION

1. Field of the Invention

This invention relates to computer systems and, more particularly, to storage management within computer systems.

2. Description of the Related Art

Many business organizations and governmental entities rely upon applications that access large amounts of data, often exceeding many terabytes of data, for mission-critical applications. A variety of different storage devices, potentially from multiple storage vendors, with varying functionality, performance and availability characteristics, may be employed in such environments. Numerous data producers (i.e., sources of new data and updates to existing data) and data consumers with different sets of storage access requirements may need to share access to the stored data. In some enterprise environments, hundreds or thousands of data producers and data consumers may be operating at any given time. Sustained update rates on the order of tens to hundreds of gigabytes per hour may need to be supported in large enterprise data centers, with spikes of even higher levels of I/O activity. In some environments, furthermore, access patterns may be skewed towards the most recently updated data: that is, instead of being uniformly spread over an entire data set, a relatively large proportion of write and read requests may be directed at a "working set" of recently modified data.

As the heterogeneity and complexity of storage environments increases, and as the size of the data being managed within such environments increases, providing a consistent quality of service for storage operations may become a challenge. Quality of service requirements may include the ability to predictably sustain performance levels (e.g., I/O throughput for applications such as database management), data integrity requirements, and the ability to recover rapidly from application, host and/or device failures. At the same time, advanced storage features, such as temporal storage management (i.e., the ability to view and/or update data as of specified points in time), replication, and archival capabilities, may also be a requirement for enterprise-level storage environments.

Given the high data production rates described above, efficient update and search mechanisms, as well as appropriate capacity planning or sizing, may be essential for ensuring predictable performance. In a typical production environment supporting applications such as database management servers and file systems, servers providing access to the storage devices may be sized and/or configured based on an a model that may incorporate expected I/O workloads (e.g., the typical number of concurrent I/O clients, typical ratios of reads to writes, etc.) for the applications. However, in addition to normal read and write operations performed on behalf of such applications, advanced storage features, such as storage archival, replication, frozen image or point-in-time versioning, and backup, may also impact the load experienced by the production servers. Such advanced storage features may be hard to include within sizing estimates for storage servers for a variety of reasons, for example because the resources required to replicate a set of volumes may increase over time (e.g., as the amount of source data for the replication grows) and may vary with the characteristics of the replication destination (e.g., the speed with which data may be transmitted to and copied at the destination, which may in turn depend on the physical location of the destination devices). It may therefore be desirable to separate production workloads from advanced storage feature workload, to minimize the impact of implementing advanced storage features upon production server performance.

In addition to the performance problems outlined above, the potential for data corruption may also increase with the size and complexity of an enterprise storage environment. While numerous vendors attempt to provide solutions to the well-known external sources of data corruption, such as malicious intruders, worms, viruses etc., the very complexity of managing large collections of storage devices may also increase the probability of inadvertent data corruption due to internal sources in some cases. One source of inadvertent data corruption may arise due to multiple users being authorized to write to a given production data storage device for different purposes. For example, a database administrator may be in charge of expanding the underlying storage space used by a database management system (e.g., by enlarging a logical volume or adding more logical volumes), and a file system administrator may be in charge of creating a clone or a replica of a file system. If the storage devices being targeted by the two administrators for their respective operations happen to overlap (e.g., if a portion of the same disk is used by both), data corruption may result. Both administrators may have been granted high levels of authorization (e.g., "root" access in Unix-like systems), allowing one to overwrite the data of the other, and to potentially damage production data. In order to reduce the chances of data corruption from both external and internal sources, and to more easily identify a cause in the event data corruption does occur, it may be useful to place restrictions on the ability to modify production data, for example by allowing production data to be modified directly only from a small set of trusted processes or hosts.

The requirements for high sustained performance, stability and predictability, advanced features such as temporal data management, replication, archival, and frozen image services, combined with the need for improved data integrity, may place a high burden on storage system managers. Mechanisms and services that support high throughput for updates and efficient data sharing, while at the same time decoupling production systems from advanced storage feature workload, and limiting the ability to corrupt production data, may therefore be highly desirable in enterprise-level storage environments.

SUMMARY OF THE INVENTION

Various embodiments of a system and method for loosely coupled temporal storage management are disclosed. According to a first embodiment, the system may include a logical storage aggregation including a plurality of data blocks, a data producer, one or more data consumers, and a temporal storage manager. The logical storage aggregation may represent any logically related set of data, such as the data of a file system or a database management server. The data producer and the data consumers may be production servers, while the temporal storage manager may be incorporated within a support host (i.e., a non-production host devoted to supporting storage management operations). Components of the temporal storage manager may also be included at the production servers, for example as a layer of a volume manager, a file system, or an operating system. The temporal storage manager may be configured to maintain a producer shadow store including entries stored in a log-structured logical volume, where each entry includes one or more data blocks of the logical storage aggregation that have been modified by the data producer, and an index for the modified data blocks. Each entry may thus logically represent a different version or generation of the logical storage aggregation—for example, the last entry may represent the latest version, the second-last entry may represent a previous version, and so on.

The temporal storage manager may also be configured to maintain a repository containing a baseline version of the logical storage aggregation, and to provide the data consumers with read-only access to the producer shadow store and the repository. The data producer may also be prevented from updating the repository directly—that is, only the temporal storage manager may have write access to the repository. The temporal storage manager may be configured to merge entries of the producer shadow store with the repository, i.e., to copy the updated data blocks from the entries to the repository. Thus, two types of update activity may occur in the system: updates to the shadow store, which may be performed in-band or synchronously by a data producer, and updates to the repository, which may be performed out-of-band or asynchronously by the temporal storage manager. In addition, in one embodiment the temporal storage manager may also be configured to purge or remove merged data entries from the producer shadow store. A merge policy and/or a purge policy may be employed to control the rate at which entries are merged and/or purged. For example, a merge policy may require that an update made by a data producer should be reflected at the repository within a specified amount of time, i.e., that the repository should not lag behind the producer shadow store by more than a specified interval. In addition, a merge policy may require a minimum delay between the time an update is requested by a data producer and the time that the update is propagated to the repository (e.g., to allow an administrator to intervene and prevent the propagation), and/or that one or more validation operations be performed on updated data prior to a merge with the repository (e.g., to prevent corruption of the repository with invalid data).

According to one embodiment, in response to a read request from a data consumer for a specified data block of the logical storage aggregation, the temporal storage manager may first search the producer shadow store. If a copy of the specified block is found in the producer shadow store, the shadow store copy may be returned to the requester. Otherwise, a repository copy of the requested block may be returned. Read requests may be satisfied synchronously from either the shadow store or the repository in such embodiments. The temporal storage manager may also be configured to maintain connection information for data consumers, indicative of the version or range of entries being accessed by the data consumers.

In addition to supporting in-band I/O (e.g., synchronous updates to the producer shadow store, and synchronous reads from the producer shadow store and the repository) and out-of-band updates to the repository, the temporal storage manager may support several additional advanced out-of-band data management functions such as archival, snapshots, replication, data migration or reorganization, monitoring and accounting in different embodiments. According to one such embodiment, the temporal storage manager may be configured to create one or more archived versions of the logical storage aggregate. For example, an archived version may be created once a day, or at other configurable intervals, based on an archival policy. The archival policy may specify that full archives be created, that delta archives (i.e., archives containing only changes relative to a previous archived version) be created, or a combination of full and delta archives be created. Archives may be stored in compressed formats in some embodiments. In addition, the temporal storage manager may also be configured to maintain or create one or more replicas of the logical storage aggregation, (for example at a remote site for disaster recovery) and one or more snapshots of the logical storage aggregation. Out-of band operations (e.g., merge/purge, archive creation, replication, snapshot creation etc.) may be performed automatically and/or asynchronously in accordance with one or more policies, and may also be performed in response to explicit requests such as synchronization requests from an application or an administrator in some embodiments.

In one embodiment, a data consumer may request that a locally modifiable version of the logical storage aggregation be created. For example, an offline analysis or data mining application may need access to a point-in-time version of transactional data, and may need to modify or annotate the local copy without persisting its changes to the original version. In response to such a request, the temporal storage manager may initialize a consumer shadow store associated with a frozen image of the repository. Entries indicative of updates made by the data consumer may be appended to the consumer shadow store, but may not be merged with the repository.

The techniques described above may allow data producers, data consumers and support hosts to operate with a high degree of autonomy (e.g., with relatively low communication overhead) and in a location-independent manner in some embodiments. For example, for normal data access, minimal communication (or no communication at all) may be required between a data consumer and other data consumers, data producers or support hosts (e.g., in embodiments where a consumer shadow store is created). Similarly, data producers may update producer shadow stores with little or no direct interaction with data consumers or support hosts, and the temporal storage manager at a support host may perform out-of-band functions (e.g., merge/purge operations, archival, replication, etc.) with a relatively limited amount of communication with data producers or data consumers. The physical distance between data producers and data consumers may have little impact on in-band I/O performance in such loosely-coupled environments, allowing large distributed storage environments to be supported. In some embodiments, support hosts may be configured for failover, or otherwise configured for high availability, allowing the temporal storage manager to quickly recover from failures.

Various other embodiments are disclosed. According to one embodiment, the data producer may comprise a plurality of instances, where each data producer instance is incorporated at a corresponding node of a cluster. Such a data producer may be termed a parallel data producer, and may represent, for example, a clustered database management system. A separate producer shadow store may be maintained for each instance of the parallel data producer by the temporal storage manager (e.g., one shadow store at each node of the cluster). The temporal storage manager may exchange coordination messages between the nodes of the cluster in such an embodiment in order to maintain a single consistent image of the logical storage aggregation. That is, a given producer shadow store at any given node of the cluster may be logically equivalent to any other producer shadow store at any other node.

Figure 1:
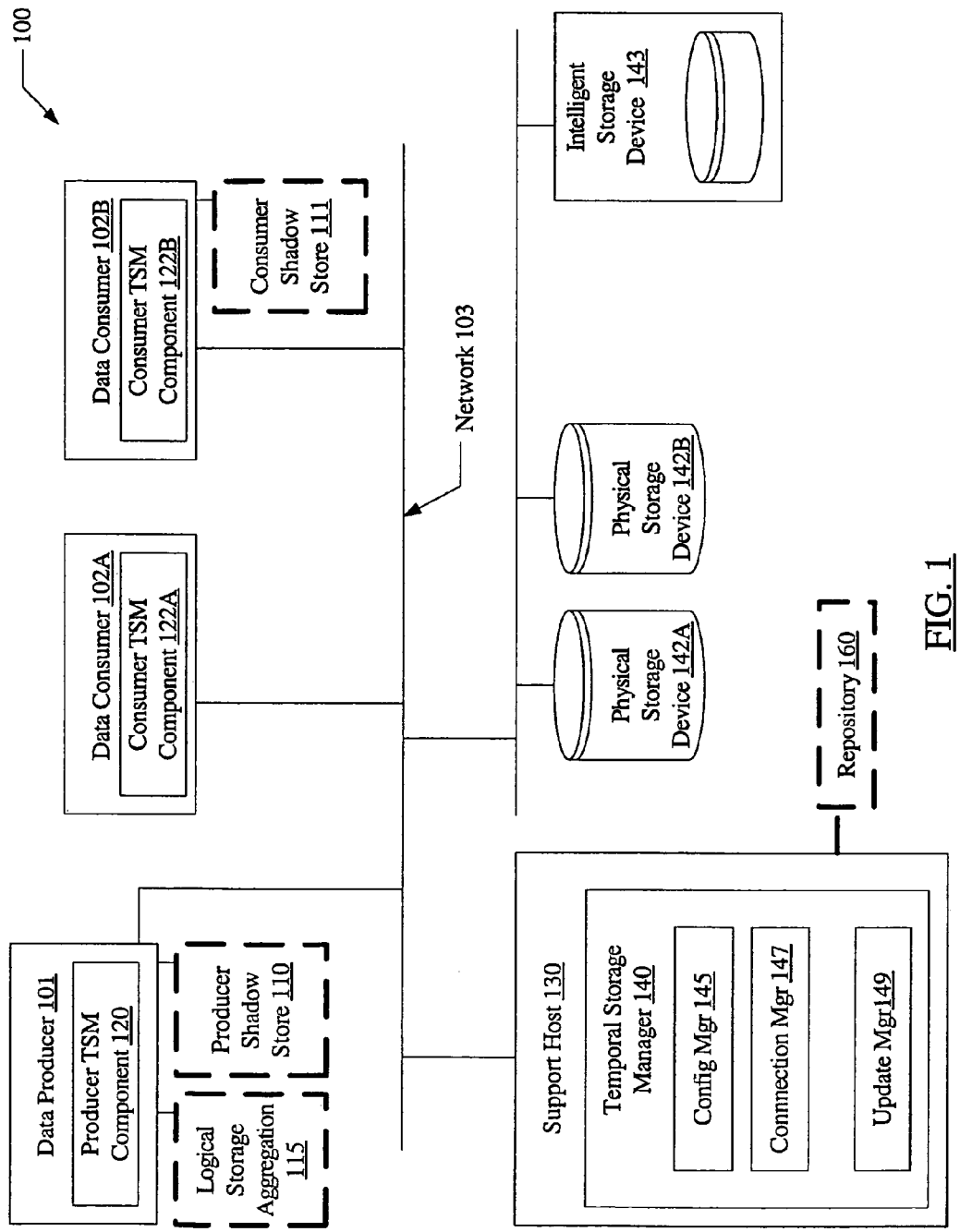
FIG. 1 is a block diagram of a system according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram of a system 100 according to one embodiment. The system includes a data producer 101, data consumers 102A and 102B, a support host 130, physical storage devices 142A and 142B, and an intelligent storage device 143 connected by a network 103. Four logical storage entities are depicted using dashed lines in FIG. 1: a logical storage aggregation 115 and a producer shadow store 110 at data producer 101, a consumer shadow store 111 at data consumer 102B, and a repository 160 at support host 130. As described below, data corresponding to these logical storage entities may be stored within physical storage devices 142 (i.e., 142A and/or 142B), intelligent storage device 143, or a combination of physical storage devices 142 and intelligent storage device 143.

Logical storage aggregation 115 may be any logically related set of data, such as one or more volumes containing the data of a file system or a database management system. Data consumers 102 and data producer 101 may be production servers in one embodiment, each handling a large number of concurrent users or client applications. A temporal storage manager (TSM) 140 (which may include components at support host 130 as well as at data producer 101 and data consumers 102) may be configured to maintain producer shadow store 110 and repository 160 in order to provide data producer 101 and data consumers 102 with access to various versions of logical storage aggregation 115. As described below in further detail, producer shadow store 110 may be a log-structured logical volume, and may include recently modified data blocks of logical storage aggregation 115 (i.e., producer shadow store 110 may include only a subset of logical storage aggregation 115), while repository 160 may include a baseline version of logical storage aggregation 115. (The term "baseline version", as used herein, refers to a version that serves as a source from which data blocks may be obtained if they are not found in the producer shadow store.)

Data consumers 102 may be provided read-only access to producer shadow store 110, while data producer 101 may be provided write access to producer shadow store 110. Both data consumers 102 and data producers 101 may be provided read-only access to repository 160. Temporal storage manager 140 may be configured to merge updates with repository 160 (i.e., copy modified data blocks of logical storage aggregation 115 from producer shadow store 110 to repository 160), e.g., in batches. Writes targeted at logical storage aggregation 115 may result in modifications of producer shadow store 110 (and may eventually be merged with repository 160), while reads may be satisfied from either producer shadow store 110 (if the requested data blocks have been modified recently) or from repository 160. As described below in further detail, updates to the repository may be performed asynchronously or "out-of-band" (that is, there may be a delay between the time at which a data block is updated in producer shadow 110 and the time at which the update is reflected in repository 160), in contrast to "in-band" or synchronous updates of the producer shadow store 110 and synchronous reads of producer shadow store 110 and/or the repository 160.

By preventing data producers from directly modifying the baseline version of the logical storage aggregation 115 in this manner, temporal storage manager 140 may reduce the likelihood of data corruption. By updating repository 160 in batches, rather than synchronously, update throughput may be smoothed over time, reducing update performance variability (i.e., reducing the size and likelihood of spikes and troughs in update throughput.) In some embodiments, a locally modifiable version of part or all of logical storage aggregation 115 may be maintained in the form of consumer shadow store 111 at data consumer 102B. As described below in further detail, updates made to blocks of logical storage aggregation 115 by data consumer 101B may be reflected within consumer shadow store 111, but may not be merged with repository 160. By requiring minimal direct communication between data producers and data consumers, and by allowing data consumers to efficiently cache local versions of desired storage aggregations, temporal storage manager 140 may support scalable loosely coupled data sharing.

In addition to merging updates, temporal storage manager 140 may also be configured to perform a variety of additional out-of-band storage management functions on logical storage aggregation 115, such as making archived versions, maintaining one or more replicas, creating snapshots, frozen images, etc. Such storage management functions may be performed by temporal storage manager 140 without impacting data producer 101; e.g., applications running on data producer 101 may be unaffected by, and unaware of, the storage management functions being performed by temporal storage manager 140. As described below in greater detail, producer shadow store may be configured for rapid recovery from system crashes and other failures. Producer shadow store 110 may thus serve as a recoverable data pipe between data producers and data consumers (e.g., data consumers 102 as well as temporal storage manager 140). By offloading the overhead of functions such as replication and archival from data producer 101 and data consumers 102, temporal storage manager 140 may help to ensure predictable performance levels and a consistent quality of service for production systems.

The techniques described above may allow data producers, data consumers and support hosts to operate with a high degree of autonomy (e.g., with relatively low communication overhead). For example, for normal data access, minimal communication (or no communication at all) may be required between a given data consumer 102 and other data consumers, data producers 101 or support hosts 130 (e.g., in embodiments where a consumer shadow store is created). Similarly, data producers 101 may update producer shadow stores 110 with little or no direct interaction with data consumers 102 or support hosts 130, and temporal storage manager 140 may perform out-of-band functions (e.g., merge/purge operations, archival, replication, etc.) with a relatively limited amount of communication with data producers 101 or data consumers 102. Producer shadow store 110 may be configured using storage devices (such as devices 142 and/or 143) supporting efficient access from data producers. Because of such efficient access to producer shadow store 110 from a data producer 101, and the limited communication required between data producers 101 and data consumers 102, the physical distance between a data producer 101 and a data consumer 102 may have little impact on in-band I/O performance. That is, in-band I/O operations may be performed in a location-independent manner, while out-of-band I/O operations may be performed by trusted entities (e.g., temporal storage manager 140) and with a minimal impact on production systems.

Further details of the manner in which the components of temporal storage manager 140, such as a configuration manager 145, a connection manager 147, and an update manager 149, may be configured to cooperate with data producer 101 and data consumers 102A and 102B to provide access to logical storage aggregation 115 via producer shadow store 110 and repository 160 are provided below. As mentioned earlier, additional components of temporal storage manager 140 may be incorporated within data producer 101 and data consumers 102 (e.g., in the form of producer temporal storage manager (TSM) component 120 and consumer TSM components 122A and 122B).

The term "shadow" (e.g., as used in "producer shadow store" and "consumer shadow store"), as used herein, generally refers to a technique of maintaining more than one version of an object, including a "current" version and a "shadow" version. Shadow techniques may be used, for example, as a method of providing recovery in transaction-oriented systems such as some database management systems. In such a database management system, for example, two versions of an object such as an index may be maintained during the life of a transaction. At the start of the transaction, the current version and the shadow version may be identical. The shadow version, which may be read during the transaction, may never be modified during the transaction, and may be maintained in non-volatile storage. The current version may be modified in response to updates made during the transaction. When the transaction commits, the current version may be written to non-volatile storage, logically and/or physically replacing the shadow version. If the transaction is aborted or a system crash occurs during the transaction, the shadow version may be retrieved from non-volatile storage, allowing the state of the database prior to the start of the transaction to be recovered. The term "log-structured", as used herein, generally refers to a write-once, append-only storage organization, where updates and/or additions (e.g., newly allocated data blocks) to the data of a log-structured device are appended to the device instead of resulting in in-place modifications. It is noted that while updated data may only be appended rather than being modified in its original location, a log-structured storage device may contain some metadata that is modifiable in place. (It is noted that, as described in further detail below in conjunction with the descriptions of FIG. 6 and FIG. 7, metadata associated with producer shadow store 110 may not be modified in place without preserving a previous version.)

Figure 2:
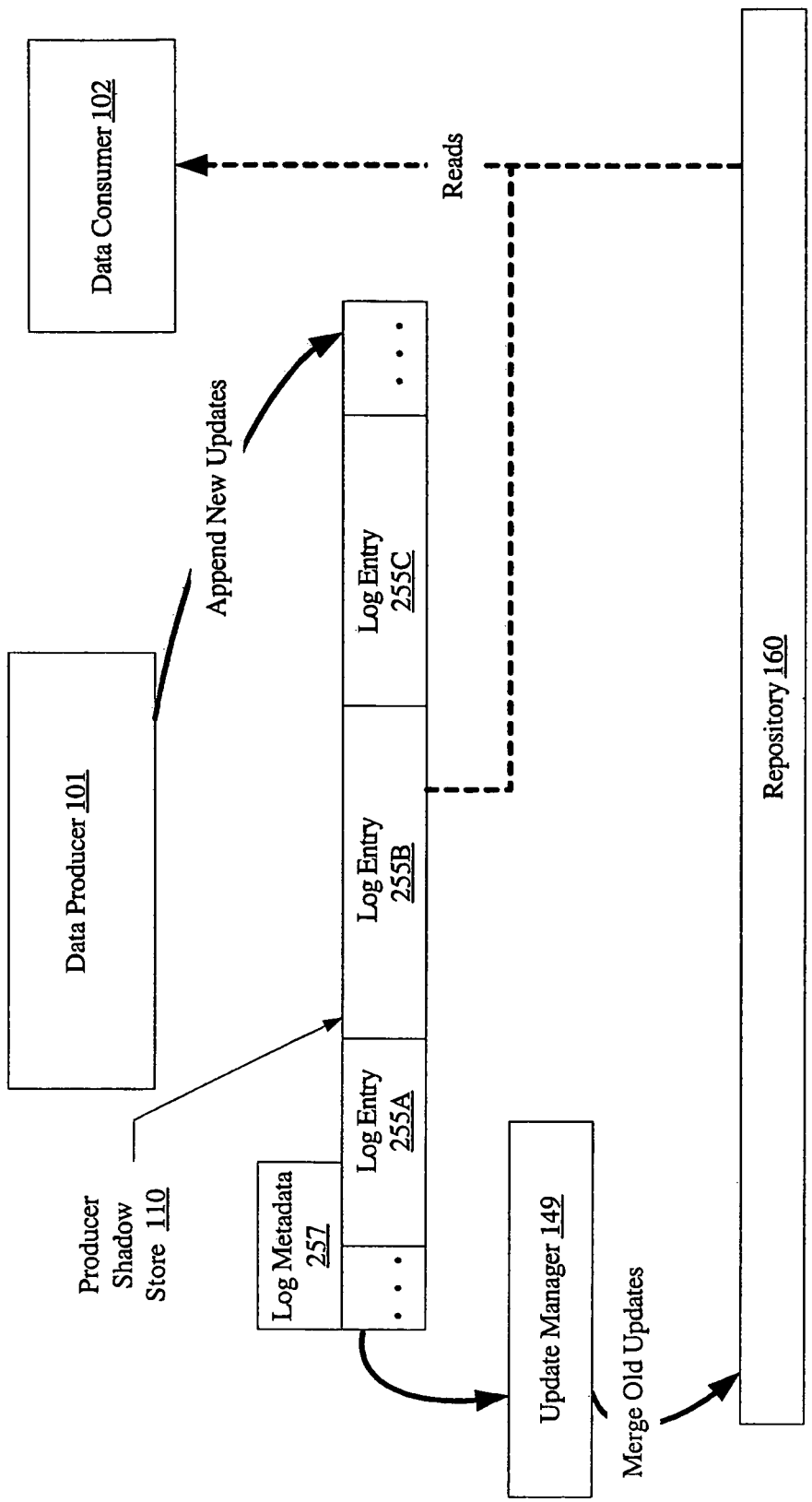
FIG. 2 is a block diagram illustrating a producer shadow store according to one embodiment.

FIG. 2 is a block diagram illustrating the structure of producer shadow store 110 according to one embodiment. As shown, producer shadow store 110 may be a log-structured storage device comprising log entries 255A, 255B and 255C (which may be referred to collectively as log entries 255), as well as log metadata 257. Data producer 101 (e.g., using producer TSM component 120) may be configured to append a new log entry 255 to producer shadow store 110 for each batch of one or more updates to the data blocks of logical storage aggregation 115. Update manager 149 may be configured to merge entries containing older updates with repository 160 (i.e., to copy the modified data blocks of older entries to repository 160), and to remove merged log entries from producer shadow store 110 over time, as described in further detail below. As shown, read requests from data consumer 102 may be satisfied from producer shadow store 110 or from repository 160.

As described previously, logical storage aggregation 115 may be any related set of data, such as a collection of one or more volumes. In some embodiments, the volumes included within a logical storage aggregation 130 may be logical volumes, while in other embodiments, they may be physical volumes (e.g., disks or disk partitions) or a combination of logical and physical volumes. Such a collection of volumes may, for example, contain a file system (i.e., a file system may be built using the logical volumes), or a collection of database tables and associated metadata. A data block of logical storage aggregation 115 may therefore be addressable by a combination of a volume identifier (which may be expressed internally as a volume number for uniqueness and/or space efficiency, instead of using a volume name), and an offset within the volume, which may, for example, be expressed in storage sectors or in blocks.

Figure 3:
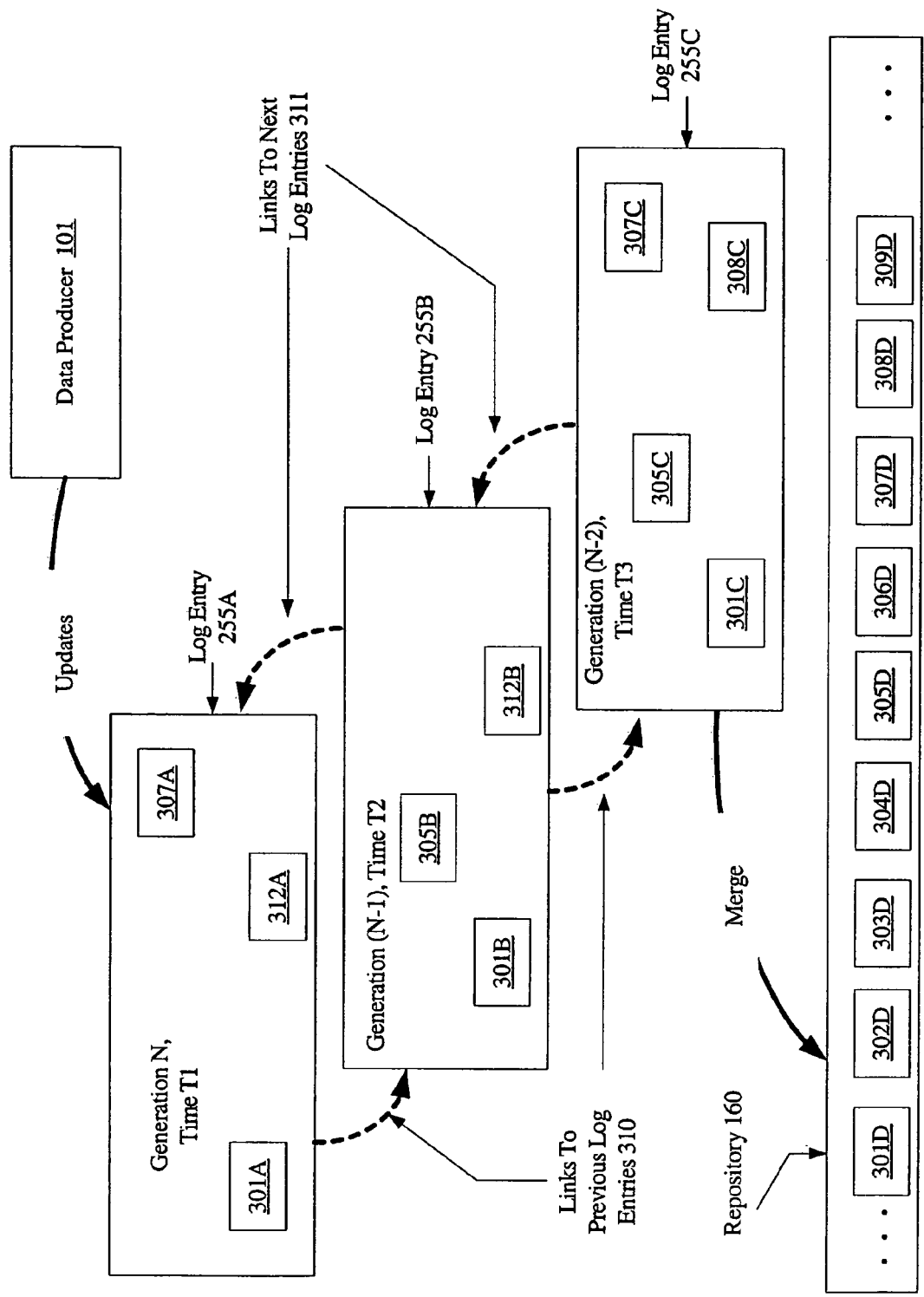
FIG. 3 is a block diagram illustrating temporal relationships between log entries of a producer shadow store and a repository according to one embodiment.

FIG. 3 is a block diagram illustrating temporal relationships between successive log entries 255 and repository 160 according to one embodiment. As described below in further detail in conjunction with the description of FIG. 5, each log entry 255 may contain a number of recently modified blocks of logical storage aggregation 115, as well as metadata and index information on the blocks. Each log entry 255 may represent a new generation of changes to logical storage aggregation 115, as of a particular modification time. In FIG. 3, for example, log entry 255A may contain modified blocks 301A, 307A and 312A, representing a generation "N" as of a modification time T1. Similarly, log entry 255B may contain modified blocks 301B, 305B, and 312B, representing an earlier generation "N−1" as of a time T2 (where T2 is earlier than T1). Thus, block 301B may represent an earlier version of block 301A, and block 312B an earlier version of block 312A. Log entry 255C may represent a generation "N−2", with modified blocks 301C, 305C, 307C, and 308C representative of changes made at a time T3, where T3 is earlier than T2. Each log entry 255 may be logically linked to previous and next log entries via links 310 and 311, and each log entry 255 may contain only a subset of the blocks of logical storage aggregation 115.

The baseline version of logical storage aggregation 115 stored in repository 160 (consisting of blocks 301D, 302D, 303D, etc.) may represent a complete version of logical storage aggregation 115 as of the last time a log entry 255 was merged with repository 160 by update manager 149. Repository 140 may thus be considered a dense, sequentially accessible version of logical storage aggregation 130, while producer shadow store 110 may represent a sparse, randomly accessible subset of logical storage aggregation 115. Producer shadow store 110 may also be considered a temporal cache containing recent updates to data of logical storage aggregation 115.

Figure 4:
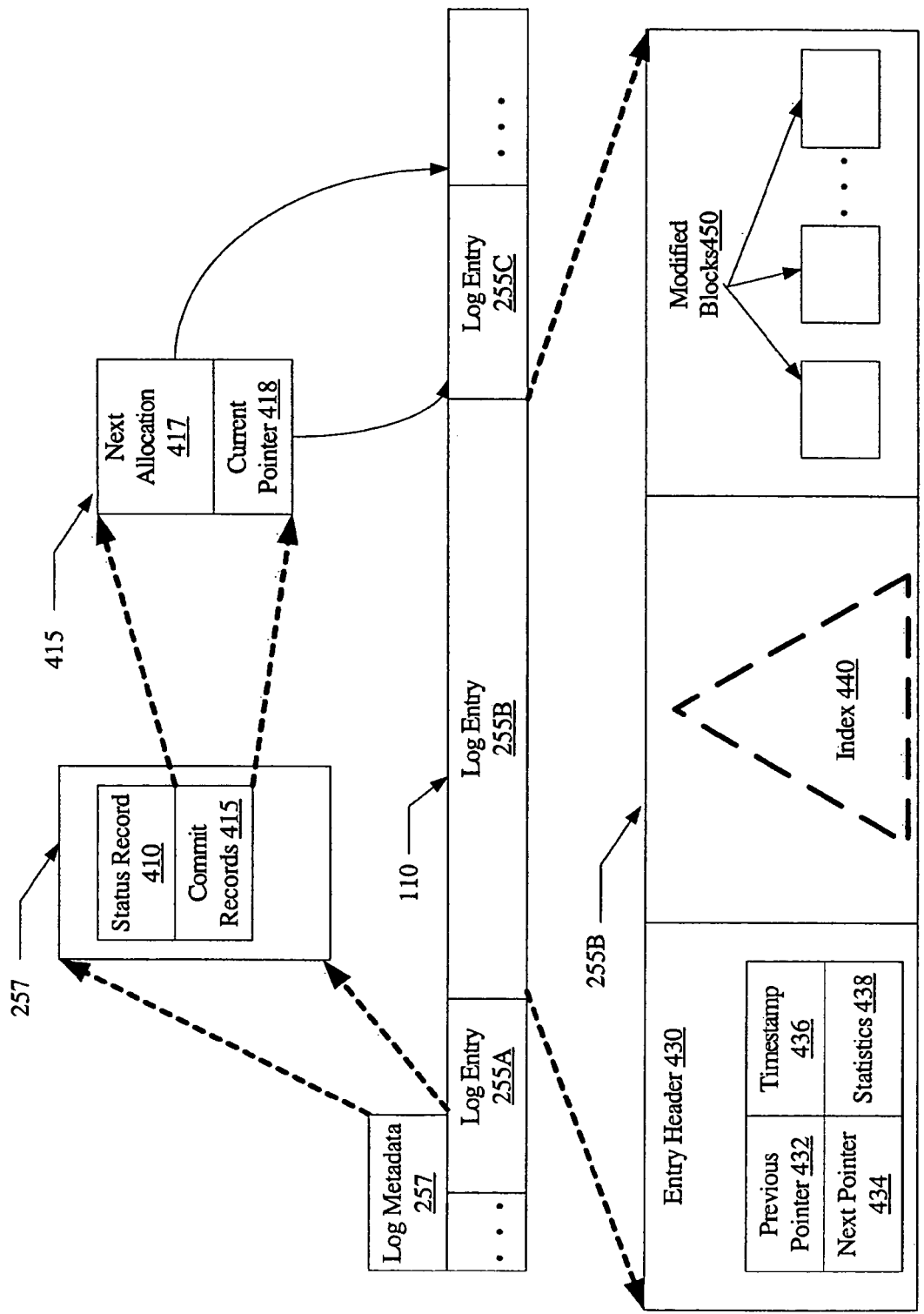
FIG. 4 is a block diagram illustrating the contents of entries and metadata of a producer shadow store according to one embodiment.

FIG. 4 is a block diagram illustrating the internal structure of log entries 255 and log metadata 257 according to one embodiment. As shown, log metadata 257 may comprise a status record 410 and one or more commit records 415. Status record 410 may include a variety of status information for producer shadow store 110, including for example pointers to the start and end of space allocated for producer shadow store 110 and pointers to the most recently merged log entry 255. Further details regarding additional information that may be maintained within status record 410 by update manager 149 are provided below. Commit records 415 may include a current pointer 418 to the most recently committed log entry 255, and a next allocation pointer 417 to the next available allocated space within producer shadow store 110 (i.e., an offset where a next log entry 255 may be appended).

Each log entry 255 may contain three kinds of information in the depicted embodiment: an entry header 430, an index 440, and a set of one or more modified blocks 450 (i.e., modified blocks of logical storage aggregate 115, such as blocks 301A, 307A, 312A shown in FIG. 3). As shown for entry 255B, an entry header 430 may contain a previous pointer 432 (corresponding to a link 310 of FIG. 3) and a next pointer 434 (corresponding to a link 311 of FIG. 3), respectively pointing to a previous log entry (e.g., 255A) and a next log entry (e.g., 255C) within producer shadow store 110. In addition, entry header 430 may also contain one or more timestamps 436 indicative of a time at which the corresponding entry 255 was created or committed, as well as statistics or accounting information 438. Index 440 may be used to speed up searches for recently modified data blocks 450 of logical storage aggregation 115 based on block address, as described below in further detail. Numerous modified data blocks 450 may be included within a log entry 255, corresponding to a batch of updates made by a data producer 110. The manner in which updates requested by data producer 110 are grouped or batched by producer TSM component 120 may be configurable (e.g., via one or more input parameters provided to temporal storage manager 140) or modifiable (e.g., based on heuristics) in some embodiments. For example, producer TSM component 120 may be configured to batch all outstanding update requests received during a specified time interval (e.g., 100 milliseconds) within one log entry 255 in one embodiment. In other embodiments the size of a batch may be based on a combination of factors, such as a specified number of updated blocks per batch and a maximum delay between the time an update to a block is requested and the time it is committed in a log entry 255. In such an embodiment, for example, a log entry 255 may be created as soon as either condition is met: either the specified number of updated blocks has accumulated, or the maximum allowed delay has elapsed.

Previous pointers 432 and next pointers 434 support sequential access to the log entries 255 in order (or reverse order) of update times. Thus, for example, update manager 149, or any application configured to create an image or copy of logical storage aggregation 115 as of a specified point in time, may start with a repository version of logical storage aggregation 115 and apply changes in log entry order (i.e., copy modified blocks 450 to the image starting with the earliest un-merged log entry, and continue copying modified blocks from successive log entries until the latest log entry prior to the specified point in time is reached). Similarly, applications configured to roll back to a previous version of logical storage aggregation 115 may start undoing block updates at the most recent log entry 255, and use previous pointers 432 to undo prior updates in reverse chronological order until the desired version is obtained.

Figure 5:
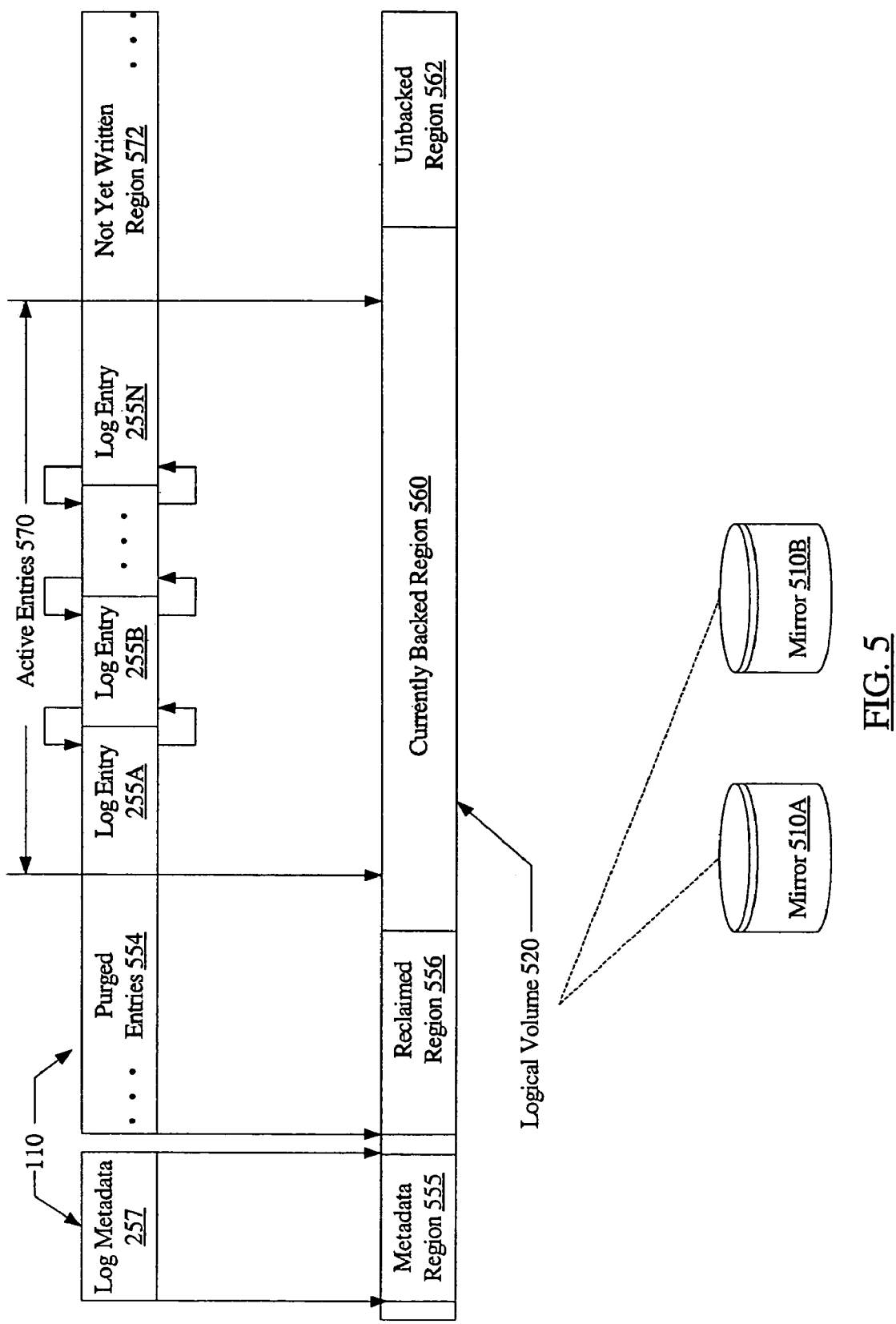
FIG. 5 is a block diagram illustrating a mapping between the constituents of a producer shadow store and a logical volume according to one embodiment.

According to one embodiment, producer shadow store 110 may be maintained as a dedicated logical volume, such as a logical volume managed by the VERITAS Volume Manager™ from VERITAS Software Corporation. FIG. 5 is a block diagram illustrating a mapping between the constituents of producer shadow store 110 and a logical volume 520 according to such an embodiment. As shown, log metadata 257 may map to a metadata region 555 of the logical volume 520, while active log entries 570 may be mapped to a currently backed region 560 of logical volume 520. As obsolete log entries are purged or removed from producer shadow store 110 (e.g., purged entries 554), the corresponding regions of logical volume 520 (i.e., region 556) may be reclaimed or freed. Such reclaimed or freed entries may be used to back future log entries (e.g., entries from "not yet written" region 572). Logical volume 520 may be implemented as a mirrored logical volume in one embodiment, including two or more mirror devices 510A and 510B (which may be mapped to physical storage devices 142 of FIG. 1). In some embodiments, logical volume 420 may also employ striping, in addition to or in place of mirroring, e.g., for performance reasons. As shown in FIG. 5, the boundaries of currently backed region 560 may not match exactly with the boundaries of active log entries 570 in some embodiments, for example because the size of currently backed region 560 may be modified asynchronously with respect to changes in active log entries 570, and/or because the units in which storage is added or removed from the backed region may differ from the sizes of log entries 255.

Index 440 may be organized as a modified B+ tree (i.e., a variant of a traditional B+ tree structure that differs from a traditional B+ tree in the manner described below) in one embodiment. In general, a B+ tree is a balanced tree index structure that may typically include a root node, one or more levels of interior nodes, and a level of leaf nodes. (If very small amounts of data are being indexed, a B+ tree may consist only of a root node and a level of leaf nodes, or in some degenerate cases of a root node alone.) A characteristic property of a traditional B+ tree is that every path from the root node to a leaf node is of the same length. That is, as the underlying indexed data changes, a B+ tree may be updated (i.e., nodes may be split and/or joined, and the number of interior levels adjusted) so that the tree remains balanced, and the number of levels traversed from a root node to any leaf node remains the same. Each node of a B+ tree includes a number of (key, pointer) pairs.

The organization of index 440 may differ from the traditional B+ tree organization, in that nodes of index 440 may be pruned or removed for space efficiency and reuse in some embodiments. Growth of index 440 may occur in a balanced fashion in such embodiments, but a removal of index nodes from the tree may temporarily result in an unbalanced tree structure. Index 440 may therefore be referred to as a modified B+ tree. Updates may be purged from producer shadow store 110, and the corresponding nodes of modified B+ tree index 440 may be pruned, once the updates have been persistently saved in some repository from which updated data can later be retrieved. The repository may be repository 160, an auxiliary mirror, an incremental backup, an archive, or any other repository to which the updates have been persisted. Thus, one effect of purging data from producer shadow store 110 is to conserve and/or re-use memory and storage resources used for the modified B+ tree index 440.

In index 440, the keys within any index node are the block addresses for the blocks of logical storage aggregation 115. The pointers contained within the nodes of index 440 may point either to other nodes of the index (in the case of root nodes and interior nodes of index 440), or they may point to modified data blocks 450 (in the case of leaf nodes of index 440). Each node (i.e., a root node, an interior node, or a leaf node) may include a node header and a set of node entries containing (key, pointer) pairs. The node header may include an indication of the lowest volume indexed within the node, and the offset (e.g., expressed as a sector number) of the lowest-numbered indexed block within the lowest volume. In some embodiments, a leaf node may be restricted to contain pointers to a single volume, so the indication of the lowest volume may be omitted from leaf node headers. In one embodiment, a merge point may also be included within an index node header. The merge point may be a pointer into producer shadow store 110, respectively indicative of the latest block merged by temporal storage manager 140, and may be used to prune obsolete entries from index nodes. For efficient manipulation and traversal of index 440, two kinds of pointer information may be maintained for each key for non-leaf nodes: a volume address of the targeted index node (i.e., an offset within volume 520), and a memory address of the targeted index node. The memory address may, for example, be expressed as a relative node number within the set of nodes of index 440. For space efficiency reasons, some or all of the information contained within the nodes of index 440, including index header fields and index entry fields, may be stored in compressed formats or may be expressed as relative quantities rather than absolute quantities (e.g., as an offset relative to a base such as a merge point rather than an absolute offset).

Figure 6:
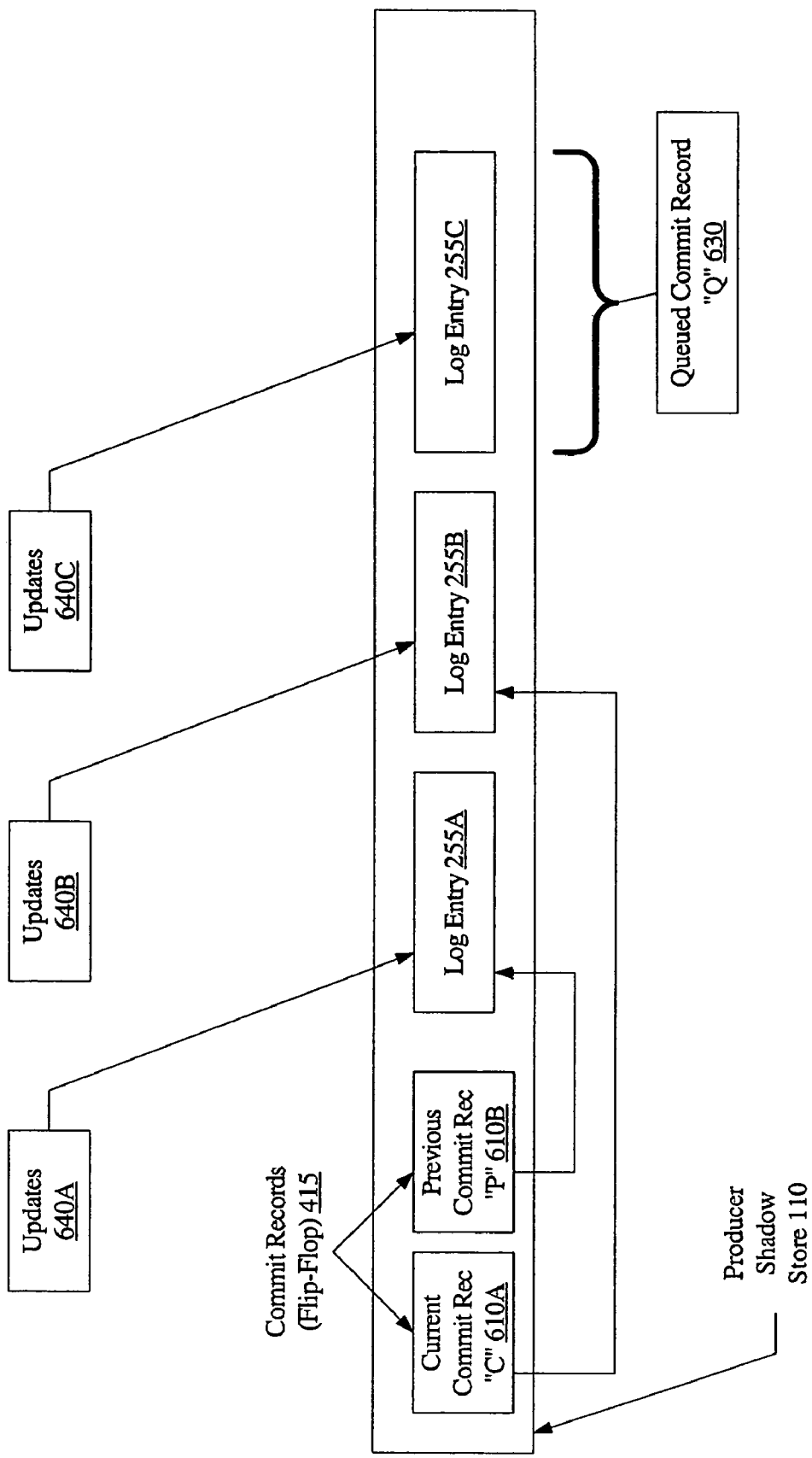
FIG. 6 is a block diagram illustrating dual commit records used to support atomic batch updates according to one embodiment.
Figure 7:
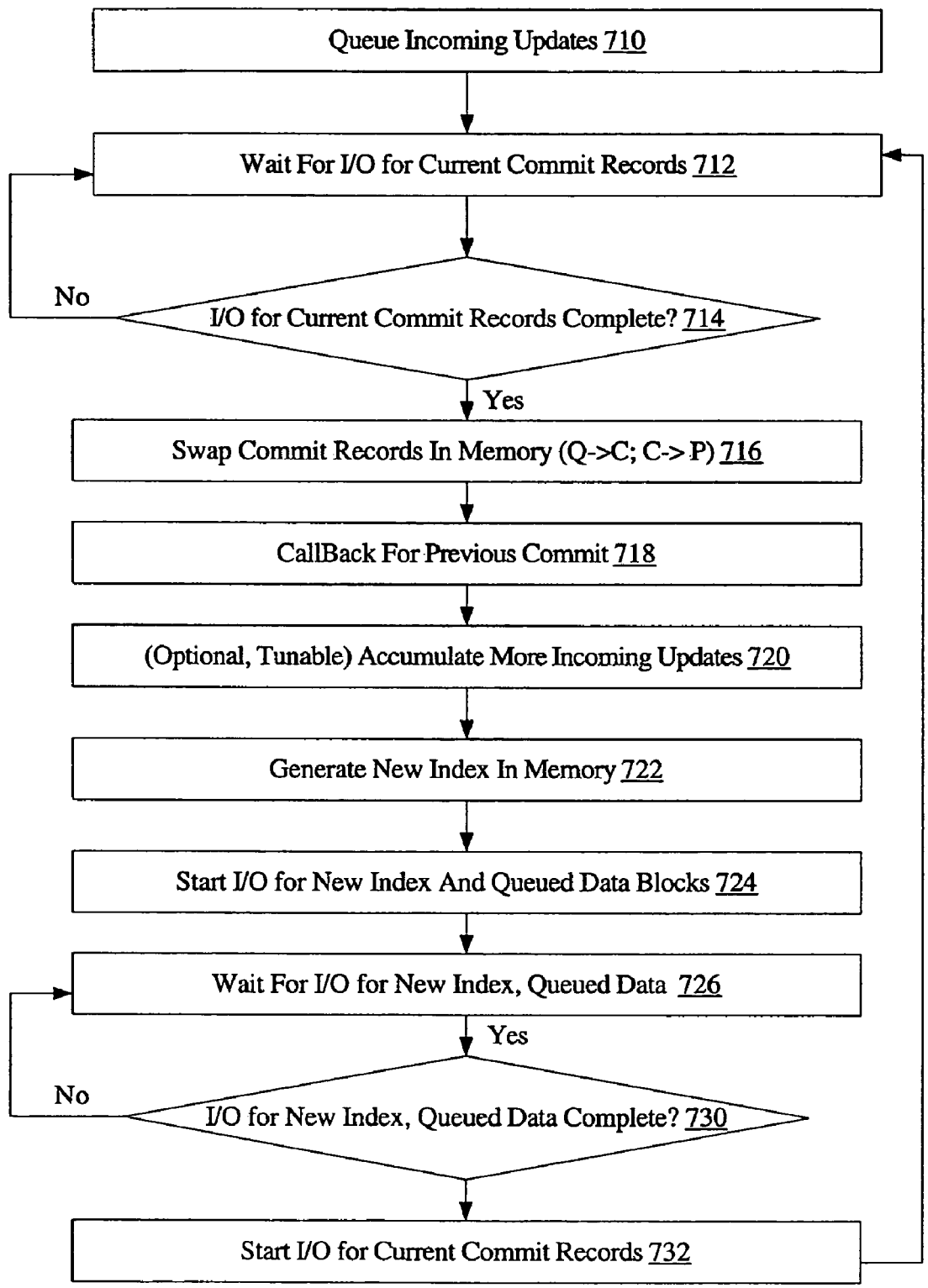
FIG. 7 is a flow diagram illustrating aspects of the operation of a producer temporal storage manager component during a batch update according to one embodiment.

As described previously, producer TSM component 120 may be configured to batch updates from data producers 101, and to create a log entry 255 in producer shadow store 110 for each batch of updates. FIG. 6 is a block diagram illustrating dual commit records 415 used to support atomic batch updates according to one embodiment. FIG. 7 is a flow diagram illustrating aspects of the operation of producer TSM component 120 during a batch update according to such an embodiment. As shown in FIG. 6, two commit records 415 may be maintained within producer shadow store 110: a current commit record 610A (which may be referred to as commit record "C") and a previous commit record 610B (which may be referred to as commit record "P"). In addition, a third commit record 630 for queued updates (which may be referred to as commit record "Q") may also be maintained in volatile memory, e.g., at a main memory of a production server hosting data producer 110. At any given time, current commit record 610A may point to the latest committed log entry (e.g., log entry 255B in FIG. 6), corresponding to a current batch of updates (e.g., updates 640B in FIG. 6), while previous commit record 610B may point to the immediately previous log entry (e.g., log entry 255A) corresponding to a previous batch of updates (e.g., updates 640A).

In handling a given set of updates 640 (e.g., 640A, 640B, etc.), in one embodiment producer TSM component 120 may first create a new log segment 255 in memory, and then perform the I/O operations to store the new log segment within a non-volatile backing logical volume 520 (e.g., on mirrored physical storage devices 510). During the time that I/O operations for a current batch of updates (and associated commit records 610A and 610B) are being performed, producer TSM component 120 may queue incoming updates (block 710 of FIG. 7), build a corresponding queued commit record 630 in memory, and wait for the I/O operations to complete (block 712). For example, during the time that I/O for batch 640B or log entry 255B is being performed, producer TSM component 120 may queue update set 840C. Control may be returned to the requesting thread or process at data producer 101 after the updates are queued, and a callback mechanism may be used later to inform the requesting thread or process that its updates have been committed. The requesting thread or process of data producer 101 may maintain outstanding updates (e.g., in memory buffers) until the outstanding updates are committed. When all I/Os for the current batch are completed (as detected by producer TSM component 120 in block 914), producer TSM component 120 may swap in-memory versions of commit records (block 716). That is, an in-memory version of previous commit record 610B may be replaced by the contents of current commit record 610A, and an in-memory version of current commit record 610A may be replaced by the contents of queued commit record 630.

Producer TSM component 120 may then perform any callback operations associated with the completed I/O operations of the just-completed commit (block 718), e.g., one or more callback routines may be invoked to indicate to the requesting thread or process of data producer 110 that its updates have been committed. In one embodiment, if a callback routine for an update or a set of updates is not invoked within a specified timeout interval, the requesting thread or process may treat the absence of a callback as an I/O error, and may resubmit updates for which callback routines have not been invoked. In some embodiments, as described above, the manner in which updates are grouped or batched may be configurable (for example, producer TSM component 120 may be configured to create a new log entry only 255 when a certain number of outstanding updates are queued). In such embodiments, producer TSM component 120 may be configured to accumulate more incoming updates (block 720), e.g., until a specified number of updates are available for the next log entry 255. Update requests received after the step illustrated in block 720 may be queued for a subsequent commit.

Producer TSM component 120 may then generate a new index 440 in memory (block 722). In generating the new index, producer TSM component 120 may traverse a current index 440, copying the contents of the current index and creating new versions of index nodes as needed. During the generation of the new index, index node entries that may point to already-merged and/or already-purged data blocks may be removed, or (for example if the index is in use by multiple threads or processes) placed in one or more lists for later removal. Similarly, one or more sub-trees of an index tree may become obsolete, and may be removed or placed in a list for subsequent removal. After the new index has been generated, producer TSM component 120 may start I/O operations for the new index and queued updated data blocks (block 724). In some embodiments, the I/O operations started at block 724 may be performed in parallel (e.g., using disk striping) in order to reduce the total time taken for all the I/Os to complete. Producer TSM component 120 may then wait for the I/O operations for new index and queued updates (block 726). Once the I/O operations are determined to be complete (block 730), producer TSM component 120 may start I/O for the current commit records (block 732), i.e., it may write the in-memory version of current commit record 610A and previous commit record 610B to the backing volume 520. Producer TSM component 120 may then again wait for the I/Os of the current commit records to complete (block 712).

It is noted that in one embodiment, not all affected (i.e., dirty or updated) nodes of an index may be written to producer shadow store 110 within the scope of a given transaction. Instead, in such embodiments, one or more special entries or annotations may be written to producer shadow store 110 as part of the transaction, where the annotations include enough information to allow the affected nodes to be written later. In some such embodiments, a checkpoint operation may be performed periodically, e.g., by producer TSM component 120 automatically or in response to a checkpoint request, to ensure that all dirty nodes have been written to producer shadow store 110, and a corresponding checkpoint record may be appended to producer shadow store 110 upon completion of the checkpoint operation.

A single commit operation may include updates from more than one update source in some embodiments. For example, in one embodiment, a data producer 101 may server as a proxy for a number of different database or file system users or clients (i.e., multiple updater threads or processes may be executed at data producer 101), while in another embodiment, multiple data producers 101 may be associated with a single producer shadow store 110. In some such embodiments, a single queued commit record 630 may be used to commit accumulated changes from a number of different users and/or data producers 101. A batch of updates from different update sources may be stored as separate log entries 255 (e.g., one log entry 255 per update source) in one embodiment, while in other embodiments, a single log entry 255 may be used to combine updates from multiple update sources.

Figure 8:
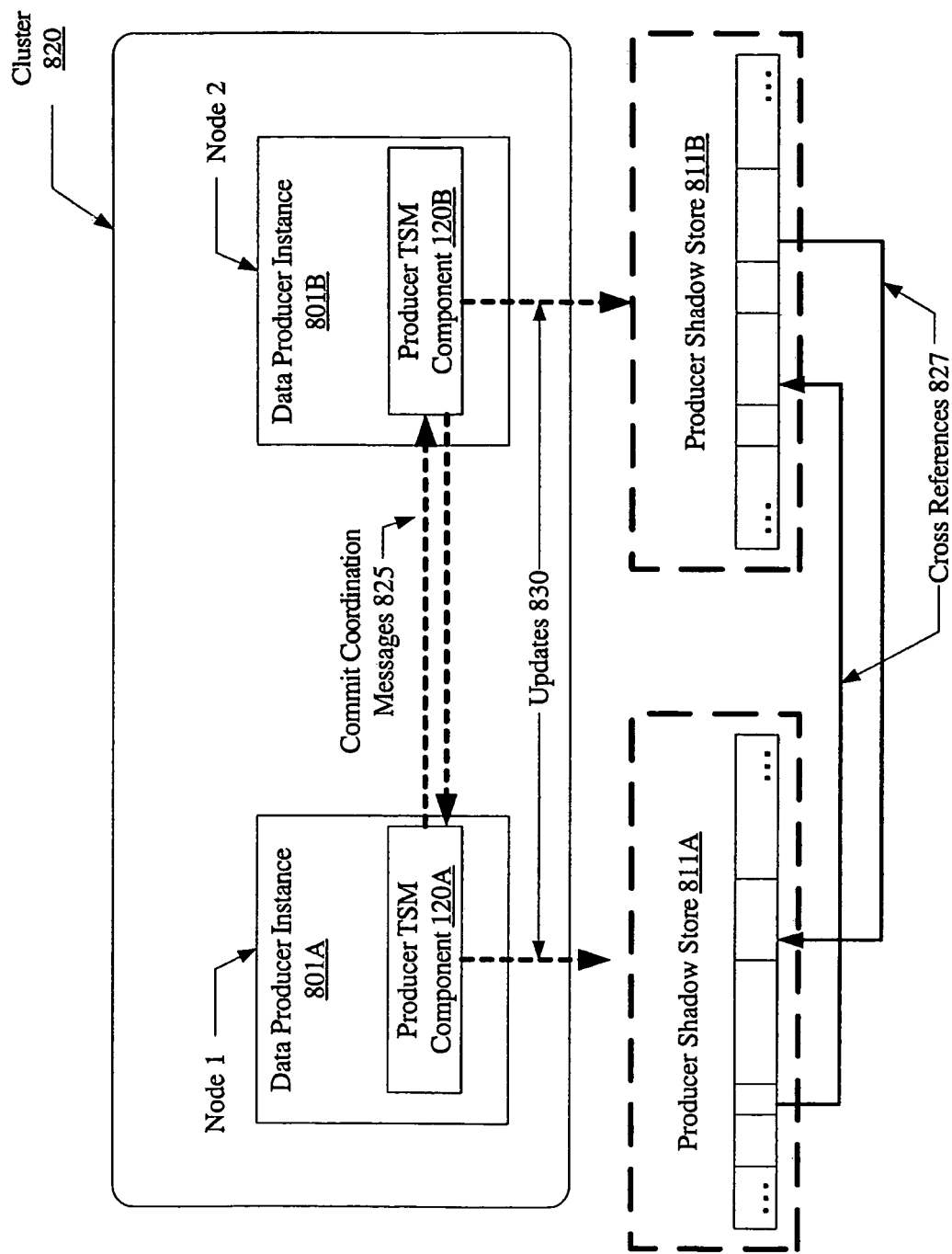
FIG. 8 is a block diagram illustrating one embodiment including two nodes of a cluster.

In some embodiments, two or more producer shadow stores may be employed in parallel to coordinate updates from a distributed or clustered application, such as a clustered database management system or a clustered file system. FIG. 8 is a block diagram illustrating one embodiment including two nodes of a cluster 820. In such embodiments, a data producer 101 may comprise a plurality of instances (e.g., data producer instance 801A and 801B), where each data producer instance is incorporated at a corresponding node of a cluster. Such a data producer may be termed a parallel data producer. Each node with a data producer instance 801 may include a local producer TSM component (e.g., 120A and 120B) configured to maintain a separate producer shadow store (e.g., producer shadow store 811A at Node 1 and producer shadow store 811B at Node 2 of cluster 820). That is, a separate log-structured logical volume such as volume 520 may be used for each node of cluster 820. Producer TSM components 120A and 120B may be configured to exchange coordination messages between the nodes of cluster 820 in order to maintain a single consistent image of logical storage aggregation 110, as described in further detail below. For example, when a batch of updates 450 is committed at a given node of cluster 820, a coordination message may be broadcast to other nodes. The coordination message may include an identification of the data producer instance 801 or the originating node of cluster 820, in addition to information on the batch of updates. Log entries 255 within a given producer shadow store such as 811A may include cross-references 827 to a producer shadow store 811B at another node. Using such cross references, in some embodiments a producer TSM component 120A at a given node may be able to access log entries 255 at a different node (e.g., when searching for a data block that may have been updated at the different node). Such a use of coordination messages and cross-references may allow a producer shadow store 811 at a given node of the cluster to be logically equivalent to any other producer shadow store at any other node.

Figure 9:
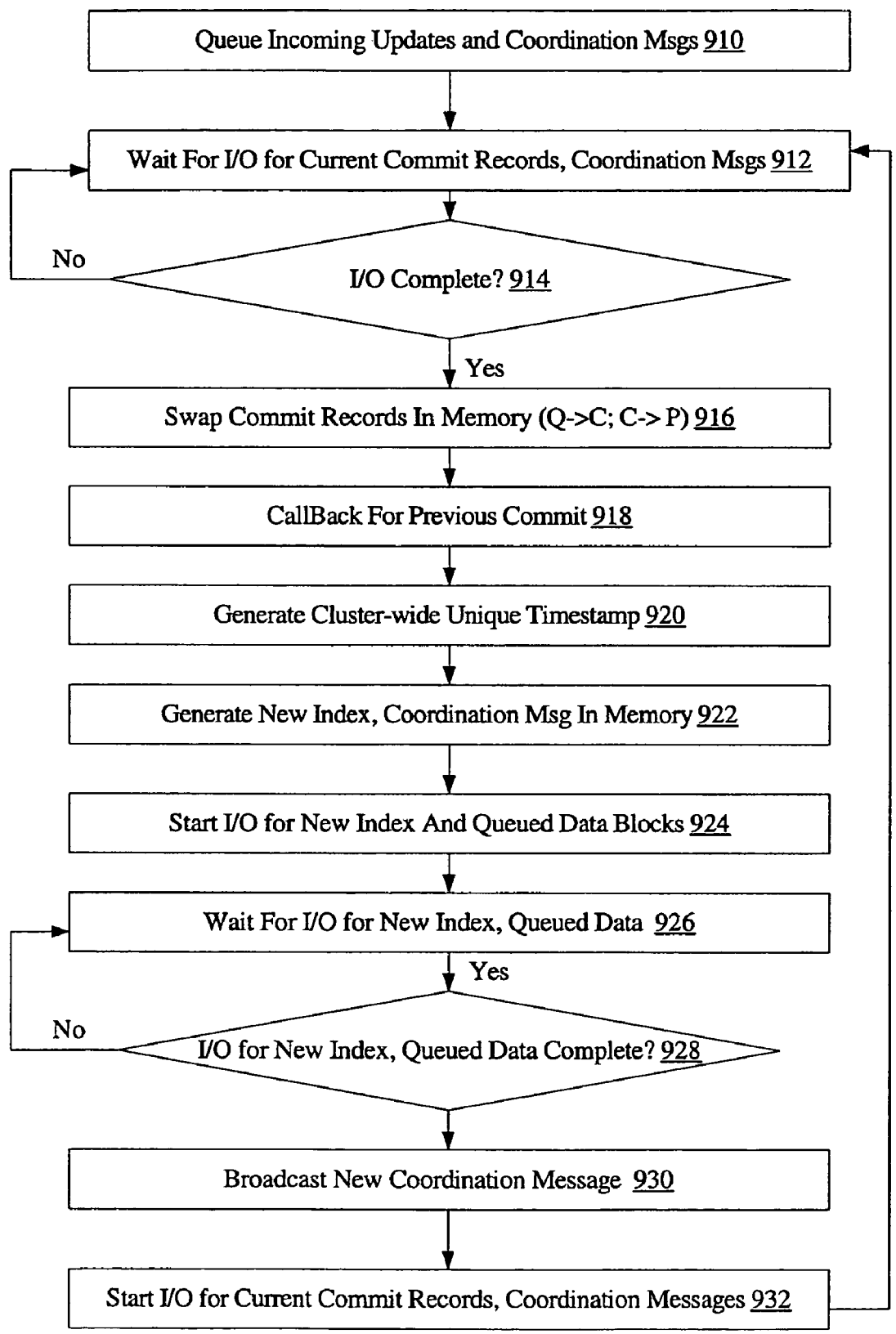
FIG. 9 is a flow diagram illustrating aspects of the operation of a producer temporal storage manager component during a commit of a batch of updates to a producer shadow store for a parallel data producer according to one embodiment.

FIG. 9 is a flow diagram illustrating aspects of the operation of a producer TSM component 120 (i.e., 120A or 120B) during a commit of a batch of updates to a corresponding producer shadow store 811 for a parallel data producer according to one embodiment. The steps illustrated in FIG. 9 differ from the steps illustrated in FIG. 7 mainly in the additional functionality related to coordination messages. While I/O operations for a current set of paired commit records and coordination messages are being completed, producer TSM component 120 may receive one or more batches of updates, as well as coordination messages from other nodes. Such incoming batches and coordination messages may be queued (block 910), and a queued commit record 630 may be maintained for the queued updates. When I/O for the current commit records and coordination messages completes (blocks 912, 914) producer TSM component 120 may swap commit records in memory (block 916) and invoke callback routines (block 918) as described earlier. (The optional step of waiting for additional updates, illustrated in block 720 may also be performed for a parallel producer shadow store after invoking callback routines, but is not included in FIG. 9). In order to be able to maintain a temporal ordering of log entries 255 across the nodes of the cluster, producer TSM component 120 may then generate a new cluster-wide unique timestamp for inclusion within the next commit record (block 920). A new index and a new coordination message may then be generated in memory (block 922), and I/O for the new index and the queued updates may be performed (blocks 924, 926, 928). Once I/O for the new index and queued updates is complete, the coordination message may be broadcast to other parallel data producer nodes (block 930). I/O for the local commit records and the local copy of the coordination message may then be started (block 932). Producer TSM component 120 may then wait for this set of I/Os to complete, and queue incoming updates and coordination messages (blocks 910, 912). In some embodiments, explicit acknowledgments of the broadcast coordination messages may be received from other nodes, e.g., during the steps illustrated in blocks 932, 910 and 912.

Recovery for a producer shadow store 110, e.g., in the event of a system crash at a data producer 101, may be performed using the dual commit records 610A and 6101B and/or mirrors 510A and 510B of logical volume 520. In one embodiment, during recovery, both commit records 610A and 610B may be read from any one of the mirrors 510A or 510B, and may be copied to the other mirror. Once both mirrors have been synchronized, the latest committed log entry 255 (as identified by current commit record 610A), including a latest committed version of an index 440, may be retrieved, thus restoring the state of log-structured storage device as of the time updates corresponding to the latest committed log entry 255 were saved. In some embodiments, if updated blocks have also been saved (e.g., if the crash occurs after the step illustrated in block 724 of FIG. 7 or block 924 of FIG. 9), producer TSM component 120 may also recreate a new index 440 using those updated blocks. In some embodiments, in the event of a crash at a first data producer host, the corresponding producer shadow store may be recovered at a second host, for example a host to which one or more data producing applications may have failed over.

As described earlier, one or more data consumers 102 may be configured to access the data of logical storage aggregation 115 via a producer shadow store 110 and/or repository 160. In one embodiment, for example, a data consumer 102 may be a production computer server configured to proxy requests from numerous clients or users. The access requirements for different data consumers may vary, both in the kinds of operations performed, and the temporal characteristics (e.g., latest version versus older version) of the data on which the operations may be performed. For example, some data consumer applications such as web-based browsing applications may require read-only access to logical storage aggregation 115, while others such as data warehousing and/or data mining applications may need to update or annotate a local version or copy of the accessed data. Many data consumer applications (e.g., web-based browsing applications) may require or prefer access to the latest-available or dynamic version of logical storage aggregation 115, while others (e.g., offline analysis applications) may require access to a frozen image as of a specified point in time. To manage these different kinds of accesses, temporal storage manager 140 may maintain information relating data consumers 102 to temporal versions of logical storage aggregation 115, and in some cases may create consumer shadow stores, as described below in further detail.

Figure 10:
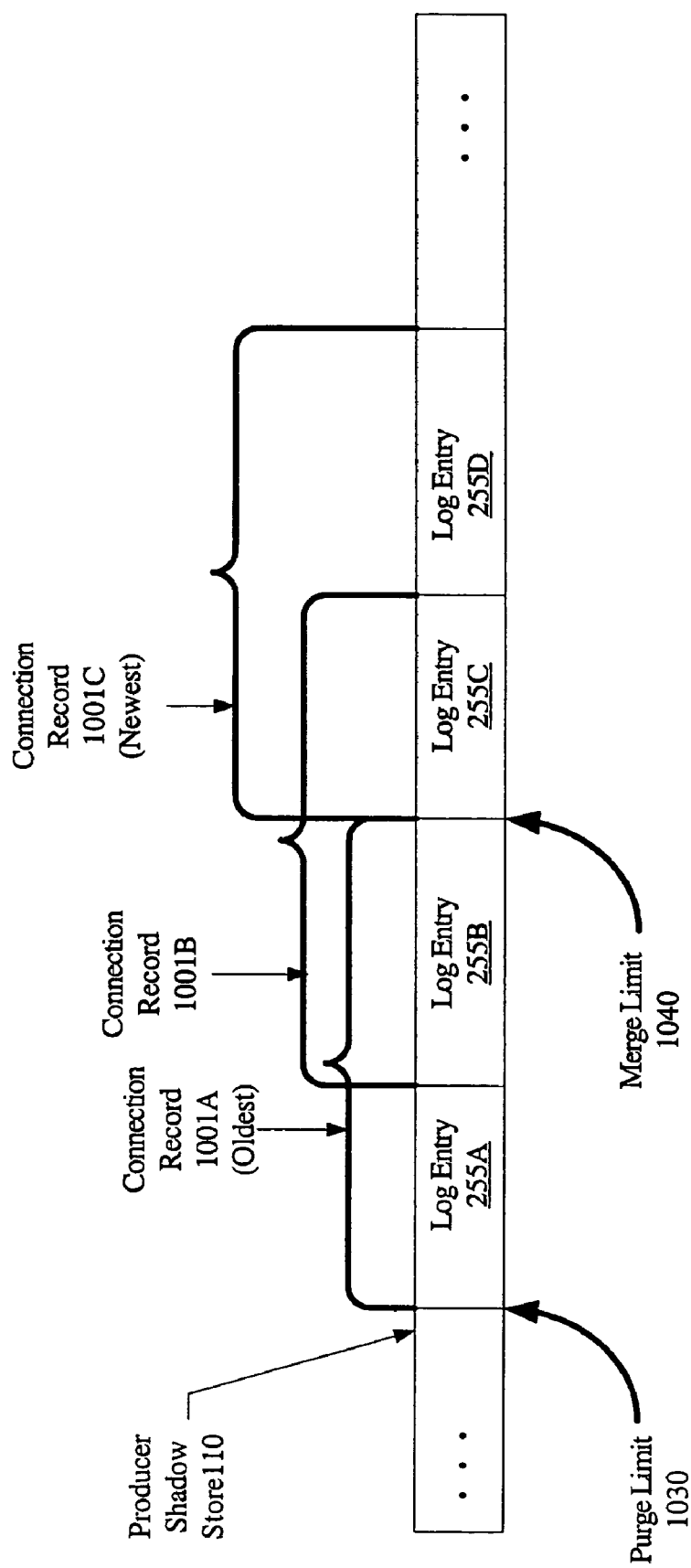
FIG. 10 is a block diagram illustrating an exemplary set of connection records maintained by a connection manager for a producer shadow store according to one embodiment.

As depicted in FIG. 1, temporal storage manager 140 may include a connection manager 147. For each data consumer, connection manager 147 may be configured to create and maintain a connection record indicative of a range of temporal versions of logical storage aggregation 115 being accessed by the data consumer. Each connection record may associate a given data consumer with a producer shadow store 110 and a repository 160. FIG. 10 is a block diagram illustrating an exemplary set of three connection records (1001A, 1001B, and 1001C) that may be maintained by connection manager 147 for a producer shadow store 110 according to one embodiment. A given connection record 1001 (i.e., 1001A, 1001B or 1001C) may contain pointers to the earliest and latest log entry 255 (representing a version of logical storage aggregation 115) being accessed by the corresponding data consumer. In the depicted example, connection record 1001A is associated with log entries 255A and 255B, connection record 1001B is associated with log entries 255B and 255C, and connection record 1001C is associated with log entries 255C and 255D.

In order to access the data of logical storage aggregation 115, a data consumer 102 may first request that a connection for it be established by connection manager 147. A request for a connection may include an indication of the specific version or range of versions of logical storage aggregation 115 to which access is desired (e.g., based on one or more timestamps), or may indicate that access to the latest available version is desired. In some embodiments, a default version (e.g., the latest committed version) may be selected if no timestamp is specified. Connection manager 147 may include identifiers for the requesting data consumer 102, the targeted producer shadow store 110, and data producer 101 along with the timestamp or version information, within a connection record for a given connection. It is noted that in some embodiments, a data producer 101 may also be a data consumer (i.e., both updates and reads may be requested from the same production server), in which case a connection record may also be maintained for the data producer.

Figure 11:
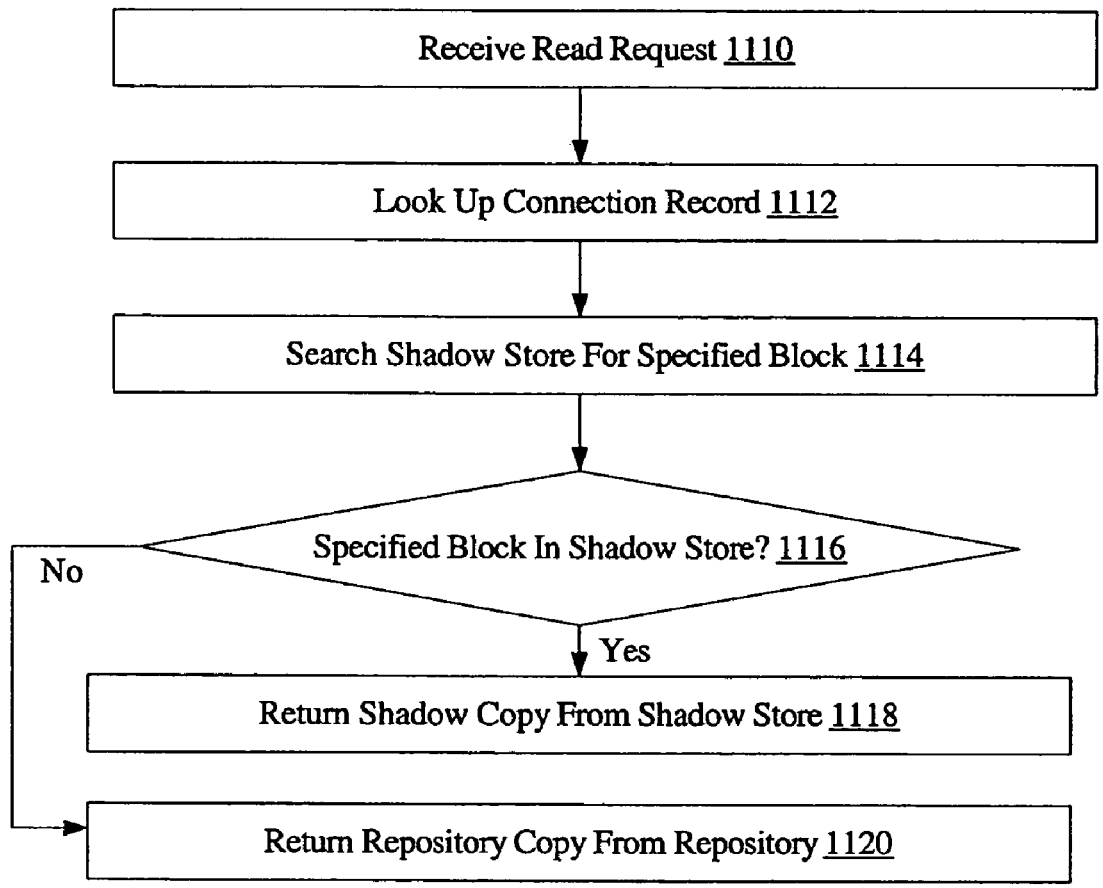
FIG. 11 is a flow diagram illustrating aspects of the operation of the system of FIG. 1 in response to a read request from a data consumer according to one embodiment.

Connection records may be used to support a number of different functions performed by temporal storage manager 140, producer TSM component 120, and consumer TSM components 122. For example, a connection record may be used to ensure that a given data consumer gets access to the correct version of data, as specified by the data consumer during connection establishment. FIG. 11 is a flow diagram illustrating aspects of the operation of system 100 in response to a read request from a data consumer 102 according to one embodiment. After a read request for a specific data block is received (block 1110) from a given data consumer 102, the connection record for that data consumer 102 may be looked up (block 1112). Based on the range of log entries to which the data consumer 102 is connected, a subset of the producer shadow store may be searched (block 1114). If the specified block is found in the producer shadow store (block 1116), a shadow copy of the block (i.e., the version of the specified block found in the shadow store) may be returned to data consumer 102 (block 1118). Otherwise, a copy from the repository may be returned (block 1120).

A connection may be terminated either voluntarily (i.e., at the request of a data consumer 102) or based on a connection management policy being implemented by connection manager 147. At any given time, a current set of open connection records may represent an in-use portion of producer shadow store 110. As described earlier, update manager 149 may be configured to merge older updates within producer shadow store 110 with repository 160, and to remove or purge merged log entries 255 from producer shadow store 110 over time. In some embodiments, update manager 149 may select a set of log entry candidates for purging and merging, based on information maintained in connection records. For example, as long as a data consumer has access to a log entry 255, the log entry may not be purged. Thus, the earliest entry of the oldest open connection record (e.g., entry 255A for connection record 1001A in FIG. 10) may establish a purge limit 130 for update manager 149 (i.e., only log entries created earlier than the purge limit may be purged). In addition, the latest entry of the oldest open connection record (e.g., entry 255B for connection record 1001B) may form a merge limit 1040 for update manager 149—that is, only log entries created no later than the merge limit entry may be merged with repository 160. (If a log entry created later than the merge limit 1040, such as log entry 255C, were to be merged with repository 160, updates requested by data producer 101 at a time later than the connection timestamp range of connection record 1001A would be accessible via the repository. Then, if a request from the data consumer with the oldest connection record 1001A were to be satisfied from the repository 160, a version created after the desired timestamp range may be inadvertently provided to the data consumer.)

In order to control the size of currently backed region 560 of logical volume 520 (as shown in FIG. 5), in some embodiments connection manager 147 may be configured to terminate connections that have been open over a threshold amount of time (e.g., as specified in a connection management policy), and to require data consumers to reconnect. By terminating connections in this manner, connection manager 147 may help ensure that inactive data consumers 102 (i.e., data consumers 102 that may have an open connection but have not accessed logical storage aggregation 115 for a while) do not delay merging and purging operations by update manager 149.

Figure 12:
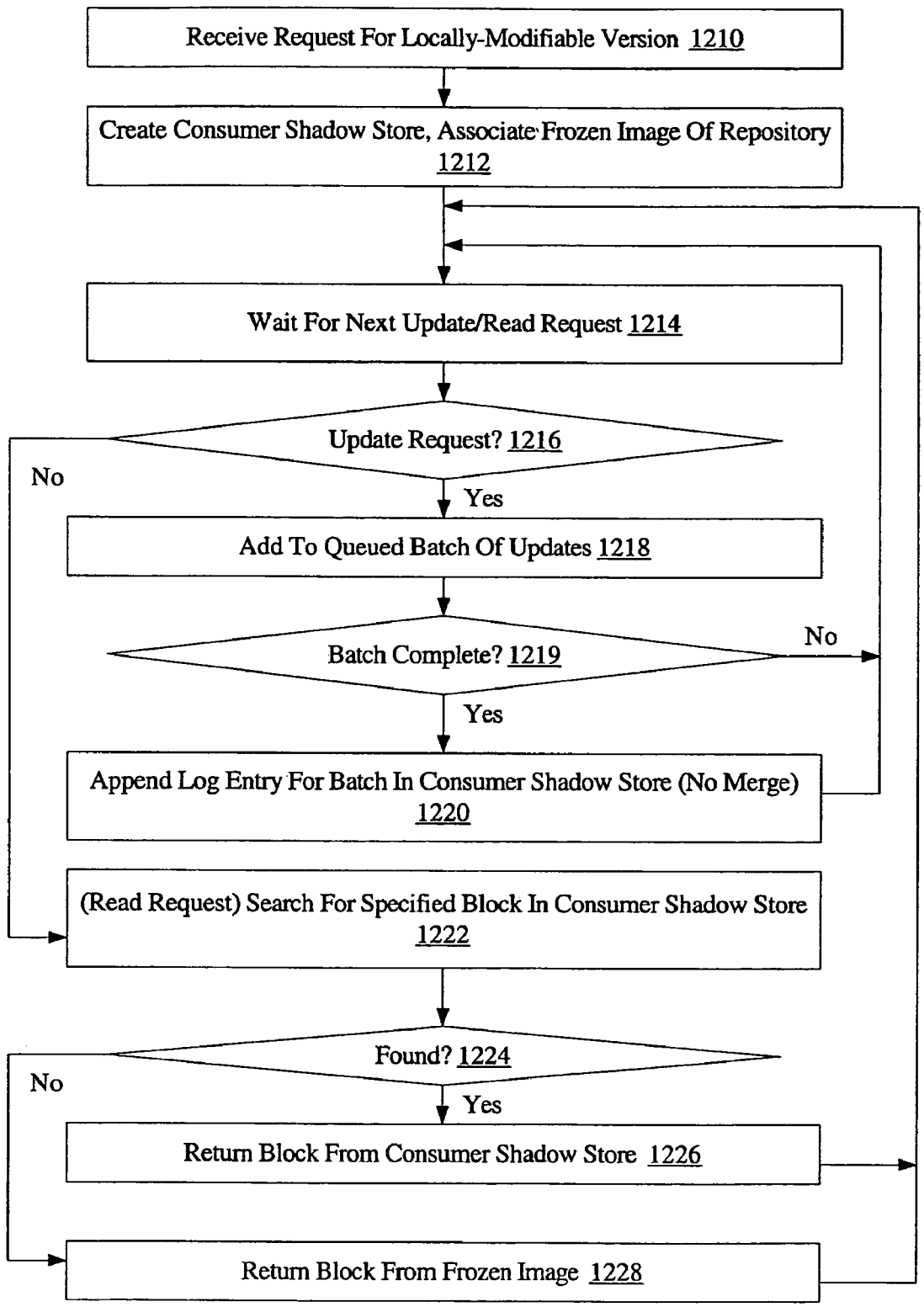
FIG. 12 is a flow diagram illustrating aspects of the operation of the system of FIG. 1 in an embodiment employing a consumer shadow store.

As described above, in some environments a data consumer 102 may require access to a locally modifiable version of logical storage aggregation 115. Such a data consumer may be referred to as a read-write (RW) data consumer in some embodiments. In response to such a request, in one embodiment configuration manager 145 of temporal storage manager 140 may be configured to create a special type of shadow store called a consumer shadow store. FIG. 12 is a flow diagram illustrating aspects of the operation of system 100 in an embodiment employing a consumer shadow store. When a request for a locally modifiable version of logical storage aggregation 115 is received from an RW data consumer 102 (block 1210), configuration manager 145 may create a consumer shadow store 111 and associate it with a frozen image of repository 160 (block 1212). That is, a new logical volume 520 may be created and initialized for consumer shadow store 111, and a frozen image of repository 160 may be created or selected from a pre-existing set of frozen images for use by the data consumer 102. Consumer TSM component 122 at the RW data consumer 102 may then wait for the next request to access or modify data of logical storage aggregation 115 (block 1214).

If the request is for an update (block 1216), consumer TSM component 122 may add it to a set of queued updates being batched (block 1218). The update batch size may be configurable, as in the case of batch sizes for producer shadow store 110. Once a batch of updates has been built (block 1219), a log entry 255 for the batch may be appended to consumer shadow store 111 (block 1220). The main distinction between consumer shadow store 111 and producer shadow store 110 is that updates from a consumer shadow store are not merged with an underlying repository 160. That is, changes made by an RW data consumer 102 using a consumer shadow store 111 may be maintained only within the consumer shadow store 111, and may not be made visible to a different data consumer 102 or data producer 101.

If the request is for a read of a specified data block, consumer TSM component 122 may search for the data within consumer shadow store 111 (block 1222). If the specified block is found (block 1224), it may be returned to the requesting data consumer thread or process (block 1226). If the specified block is not found in the consumer shadow store 111, a copy from the frozen image of the repository may be returned (block 1228). After each read or update request has been handled as described above, consumer TSM component 122 may again wait for the next request (block 1214).

In some embodiments, configuration manager 145 may also be configured to create a consumer shadow store 111 for a read-only (RO) data consumer 102. Such a consumer shadow store may serve as a local cache at the RO data consumer, and may reduce the performance overhead involved in obtaining data blocks across network 103. For example, in one embodiment, an RO data consumer 102 may require repeated access to only a small subset of logical storage aggregate 115. A consumer shadow store 111 may be created exclusively for such an RO data consumer 102, and populated with only the subset of data to which the RO data consumer requires access (e.g., corresponding to a specified version or timestamp range of a producer shadow store 110). Once the consumer shadow store 111 has been populated, and an index 440 built for it, the read-only data consumer 102 may perform all its accesses locally, with no further interaction with data producer 101. In one embodiment, an RO data consumer may request that its version be refreshed, i.e., brought up-to-date with the latest version of storage aggregation 115. Temporal storage manager 140 may respond to such a refresh request by copying newer versions of data blocks from a producer shadow store 110 or from a repository 160 into the consumer shadow store 111.

As described earlier, update manager 149 may be configured to merge and purge log entries 255 of producer shadow store 110. The rates at which updates are merged and/or purged from producer shadow store 110 may be governed by a number of factors, including open connections to producer shadow store 110 as described above, as well as configurable merge policies and/or purge policies, etc. For example, in some embodiments, a merge policy may be in use that requires repository 160 to be no more than a specified amount of time (e.g., five minutes) "behind" the producer shadow store 110 (i.e., if a data block 450 is updated at time T, it must be merged within repository 160 no later than five minutes after T). In such an embodiment, update manager 111 may be configured to select data blocks 350 for merge candidates based on timestamps in the corresponding log entries 255, while remaining within merge limit 1040 as shown in FIG. 10. Additional considerations may also be taken into account within merge policies: for example, in some embodiments a merge policy may require a minimum delay between the time an update is requested by a data producer 101 and the time that the update is propagated to repository 160 (e.g., to allow an administrator to intervene and prevent the propagation), and/or that one or more validation operations be performed on updated data prior to a merge with the repository (e.g., to prevent corruption of the repository with invalid data). Similarly, among the merged entries of producer shadow store 110 that may be within purge limit 1030, a purge candidate may be selected by update manager 149 based on a purge policy, such as a policy that requires that the percentage of logical volume 520 holding merged data blocks may not exceed a specified threshold. As needed, update manager 149 may allocate more storage for logical volume 520, or free up and reuse older regions of logical volume 520, thus modifying the size of currently backed region 560.

In addition to merge and purge operations, in some embodiments update manager 149 may also be configured to provide various other storage functions, such as creating archival versions of logical storage aggregation 115, creating or maintaining one or more replicas of logical storage aggregation, reconfiguration or migration of logical storage aggregation 110, monitoring (such a performance monitoring) and/or accounting of I/O operations, etc. For example, an archival policy may be implemented within system 100 that requires that an archive version of logical storage aggregation 115 be created at a specified frequency, e.g., once a day. Full archives (i.e., complete versions) may be created in some embodiments, while delta archives (i.e., archives containing only changes relative to a previous archive) or a combination of full and delta archives may be created in another embodiment. Archived versions may be stored in compressed formats, for example on devices similar to physical storage devices 142 or intelligent storage device 143. In addition to creating archived versions, update manager 149 may also be configured to maintain or create one or more replicas of logical storage aggregation 115, e.g., for disaster recovery. Such replicas may be maintained or created at remote sites in some embodiments.

Figure 13:
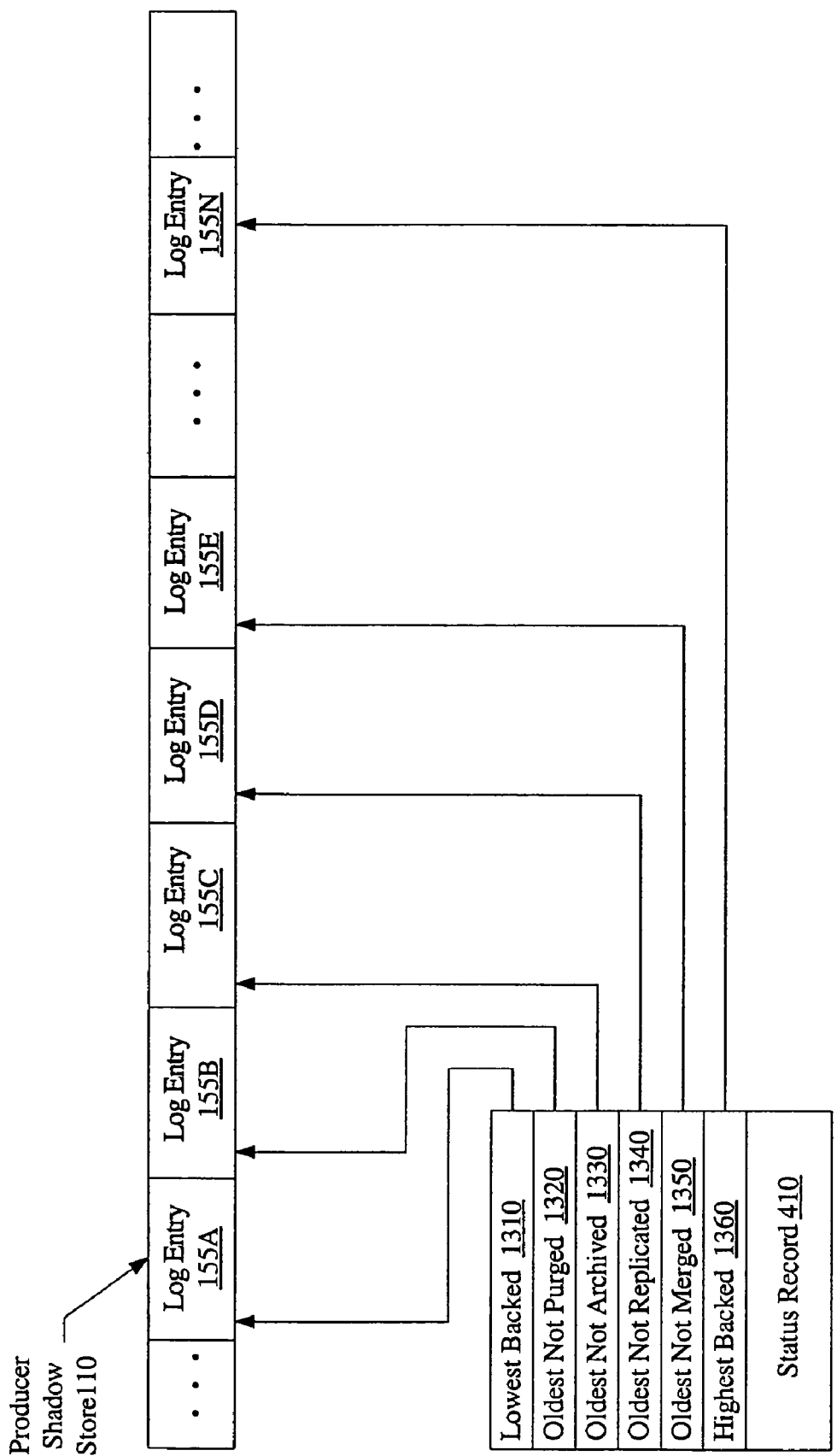
FIG. 13 is a block diagram illustrating an example of pointer entries that may be maintained within a status record according to one embodiment.

For each such function (e.g., archival, replication, etc.) being implemented, update manager 149 may maintain one or more pointers within status record 410 (part of metadata 257 for producer shadow store 110, shown in FIG. 4). FIG. 13 is a block diagram illustrating an example of pointer entries that may be maintained within status record 410 according to one embodiment. Status record 410 may include pointers to the oldest unpurged log entry (pointer 1320), the oldest unmerged log entry (pointer 1350), the oldest unarchived log entry (pointer 1330), and the oldest unreplicated log entry (pointer 1340). (It is noted that the depicted order of these entries is only an example, and does not imply a logical ordering requirement; e.g., the relative positions of the oldest unarchived log entry, the oldest unreplicated log entry, and the oldest unmerged log entry, may differ from those shown in FIG. 13). Status record 410 may also include pointers to the lowest backed (1310) and highest backed (1360) log entries, indicative of currently backed region 560 of logical volume 520 as shown in FIG. 5.

As described earlier, the asynchronous merging of updated data to repository 160 may allow update performance to be smoothed over time, reducing update performance variability (i.e., reducing the size and likelihood of spikes and troughs in update throughput.) That is, asynchronous or deferred merging may support load leveling of underlying resources such as disk arrays, I/O channels, network paths to I/O devices, and the like. While a data producer 101 may generate bursts of updates, update manager 149 may distribute the corresponding I/O operations over a desired period using an appropriate batch size and/or merge delay. Thus, a set of physical I/O operations that requires N minutes for completion at underlying hardware devices, performed in response to an M-minute burst of update requests from data producer 101, (where M is less than N), may be spread out uniformly over N or more minutes by update manager 149. In one implementation, for example, update manager 149 may read updated data blocks 450 from a disk array cache associated with producer shadow store 110, and write the updated data blocks to a second disk array cache associated with repository 160 uniformly over a desired period. It is noted that configuration parameters such as the size of the disk cache associated with producer shadow store 101 in such an implementation may impact merge performance as the load-leveling period (i.e., the period over which update manager 149 distributes writes) increases. For example, if update manager 149 attempts to distribute updates received during a long period (e.g., several hours), some of the updated blocks may have been displaced from a cache associated with producer data store 101, thereby requiring disk accesses and resulting in a degradation in merge performance.

It is noted that the delay between the time at which an update occurs at a producer shadow store 110, and the time at which the updated data is reflected at a data consumer 102, or at another replication location, may vary in different embodiments. For example, in some environments where replication occurs over a relatively slow network, an update may not be reflected at a replication site for hours; while in other environments, the replication delay may be effective within milliseconds. In some embodiments, the delay or time lag between data producers and data consumers (including replication consumers) may be measured or tracked and/or controlled via directives issued by data producers 101 and/or data consumers 102. That is, in some embodiments, a data producer 101 and/or a data consumer 102 may issue a command or directive to temporal storage manager 140 requesting an adjustment of the delay. In some embodiments, a data producer 101 or a data consumer 102 may issue an explicit request to synchronize a producer shadow store with an out-of-band version of logical storage aggregation 115 such as a replica.

Figure 14:
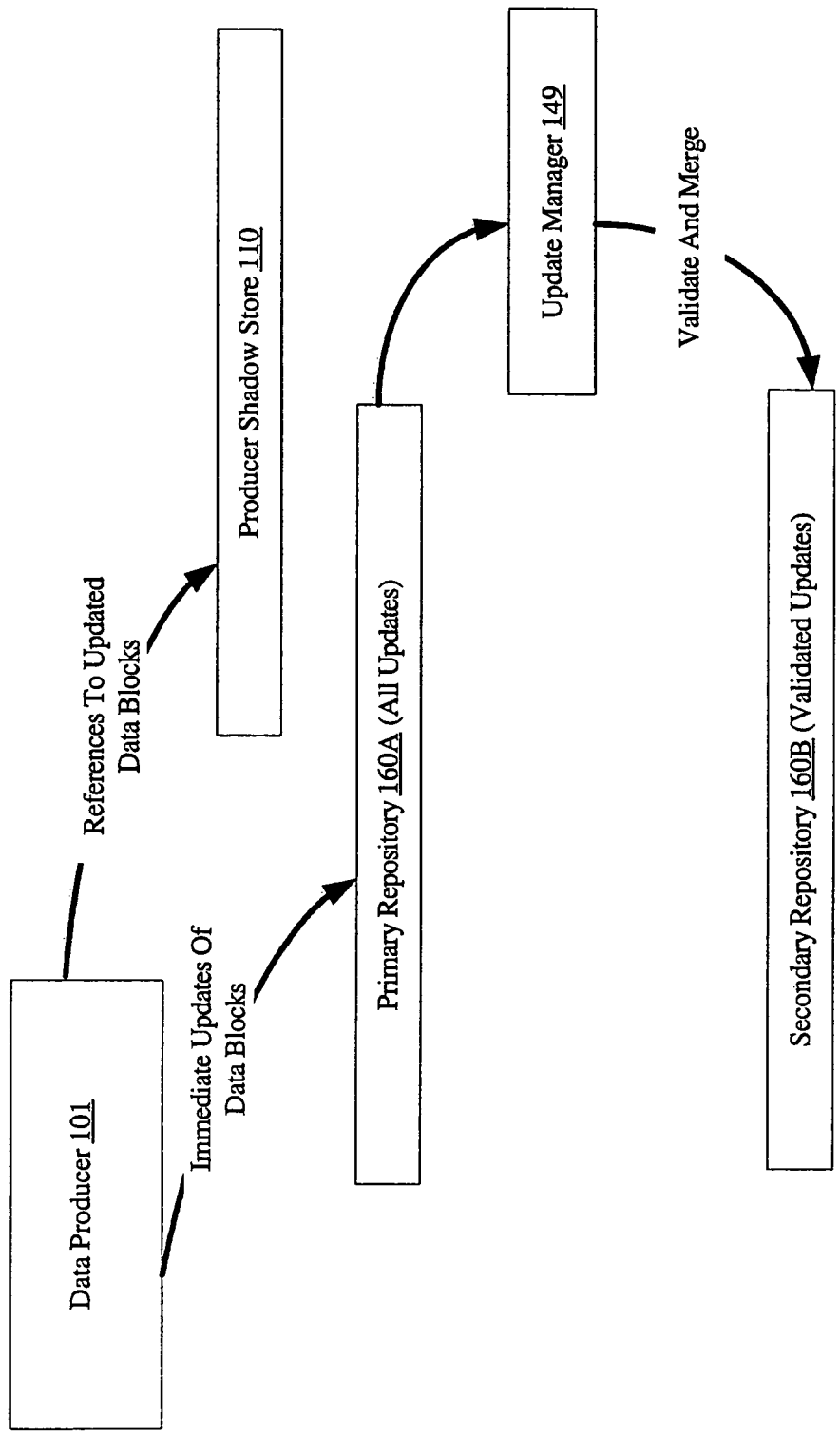
FIG. 14 is a block diagram illustrating a use of a primary repository and a secondary repository according to one embodiment.

Instead of using a single repository 160 into which updates from a producer shadow store 110 may be merged asynchronously as described above, in one embodiment a plurality of repositories may be used. FIG. 14 is a block diagram illustrating the use of a primary repository 160A and a secondary repository 160B according to such an embodiment. In the illustrated embodiment, data producer 101 may be configured to immediately update primary repository 160A with modified data blocks 450, instead of relying on update manager 149 to gradually merge updates from producer shadow store 110 as described previously. In one such embodiment, the entries written to producer shadow store 110 may include only references (such as index entries or annotations) to modified data blocks 450, instead of also including the modified data blocks themselves, thereby reducing the space required for producer shadow store 110. Such a multi-repository configuration, where a data producer 101 may be given write access to immediately update primary repository 160A, may be referred to as an immediate-update configuration (in contrast to a single repository configuration where updates to the repository are merged gradually by update manager 149, which may be termed a deferred-update configuration). Update manager 149 may be configured to merge updated data blocks asynchronously from primary repository 160A to secondary repository 160B, for example after performing one or more validation operations on the updated data. Data producer 101 may be granted read-only access to secondary repository 160B, and read-write access to primary repository 160A and producer shadow store 110. Secondary repository 160B may thus contain validated updates, while primary repository 160A may contain all updates. Secondary repository 160B may therefore be used to restore data blocks of repository 160A that should not have been updated, i.e., to restore blocks of repository 160A that contain invalid data.

In some embodiments, more than one support host may be used for temporal storage manager 140. For example, in one embodiment, a cluster of two or more nodes or hosts may be employed, of which a first node may be designated as a default or primary node and a second node may be designated or selected as a failover node. Under normal operation, temporal storage manager 140 may be incorporated within the default node. If the default node fails or crashes, or loses connectivity (e.g., to a data producer 101, a data consumer 102, or a repository 160) or is otherwise unable to support temporal storage manager 140, temporal storage manager 140 may be configured to fail over to the second node. In other embodiments, the functionality provided by temporal storage manager 140 may be distributed across multiple hosts during normal operation. For example, one host may support configuration manager 145, another may support connection manager 147, and one or more hosts may support update manager 149.

Some operations performed by temporal storage manager 140 may be initiated by explicit requests from data producers 101, data consumers 102, or system administrators. For example, in one embodiment, a data producer 101 may request a merge operation, a creation of a snapshot or a frozen image of logical storage aggregation 115, or a synchronization of one or more producer shadow stores (e.g., with a repository 160). A data producer may request a listing of all data consumers currently connected to a producer shadow store. A data consumer 102 may request that a connection be closed, or request an identification of a data producer 101 associated with a producer shadow store of interest.

As described above, a number of different policies may be used in conjunction with shadow stores, such as connection management policies, merge policies, purge policies, archival policies, replication policies, and the like. Such policies may be stored in a policy database in some embodiments. A policy database may be maintained within support host 130 in some embodiments, and in a separate host in another embodiment. Requests to change the policies (e.g., from data producers 101, data consumers 102, or system administrators) may be handled by configuration manager 145. In some embodiments, merging may be temporarily or permanently disabled, or a "null" repository requiring no storage space may be employed, so that I/O activity is restricted to a producer shadow store 110.

It is noted that indexing structures other than the modified B+ trees described above may be used within producer shadow store 110 in some embodiments. For example, variants of tree indexing structures such as B-link trees, B* trees, R-trees, as well as hash-based indexing techniques may be used in different embodiments.

In general, a data producer 101 may be any device or software module capable of updating a logical storage aggregation 115 as described above, such as a server computer system, including one or more processors and one or more system memories. A single data producer 101 may also utilize multiple producer shadow stores 110 in some embodiments, for example where updates to a first set of volumes forming a database are handled using a first log-structured storage device, and where updates to a second set of volumes for a file system are handled using a second log-structured storage device. Similarly, a data consumer 102 may also be any device or software module capable of accessing (and updating, e.g., in the case of a RW data consumer) a logical storage aggregation 115 as described above, such as a server computer system. Producer TSM components 120, consumer TSM components 122, and temporal storage manager 140 may be included as layers or components within a volume manager in one embodiment. In other embodiments, they may be included as components within a file system or an operating system, or may be a standalone software product.

Any updatable physical storage devices 142 including disks, disk arrays, tape devices, optical storage devices, etc., may be used to back part or all of shadow stores 110 and 111, repository 160, archival versions, replicas and snapshots of logical storage aggregation 115. In some embodiments, intelligent storage devices 143 such as intelligent disk arrays, virtualization switches or virtualization appliances, may be used in addition to (or instead of) physical storage devices 142. For example, some intelligent storage devices used for repository 160 may be configurable to prevent writes over a specified set of access ports or connections (whish may be used for data producers 101 and data consumers 102), while allowing write access from another specified set of access ports (which may be used for support hosts 130). Access to the physical storage devices may be possible via a number of different storage connectivity protocols, such as various versions of Small Computer System Interface (SCSI), fibre channel, Internet SCSI (iSCSI), and the like. The physical and intelligent storage devices may also be accessible via a storage area network (SAN) or another appropriate network (e.g., using IP), or may be directly attached to one or more hosts shown in system 100.

Various techniques may be used to improve the performance of the operations performed on producer and consumer shadow stores in different embodiments. For example, information within the entries of index 440 may be compressed and/or relative offsets may be used rather than absolute offsets. Index node entries may be restricted to be of a small fixed size (such as 128 bytes) for easy traversal and to increase the fan-out of index 440. Write operations may be page-aligned to prevent a single write operation from being split into multiple physical I/Os, and disk sectors (e.g., to mirrors 410 backing volume 420) may be updated atomically.

Figure 15:
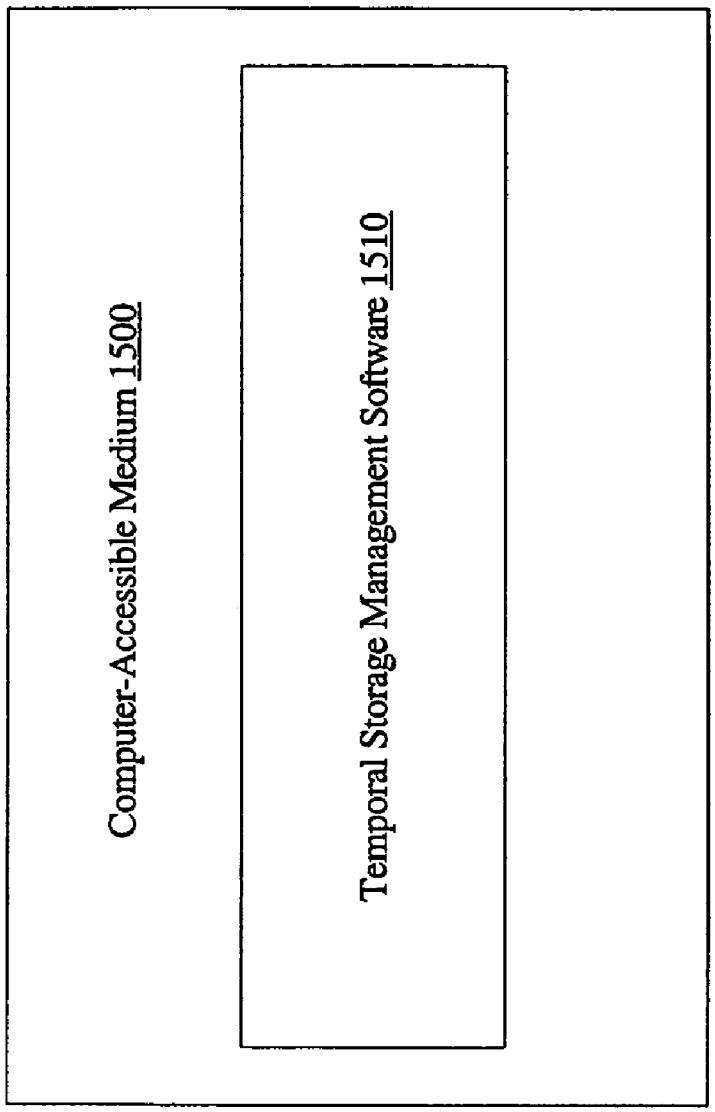
FIG. 15 is a block diagram illustrating a computer-accessible medium according to one embodiment.

FIG. 15 is a block diagram of one embodiment of a computer accessible medium 1500, comprising temporal storage management software instructions 1510 executable to perform the functionality of temporal storage manager 140, producer TSM component 120 and consumer TSM component 122 as described above. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a logical storage aggregation comprising a plurality of data blocks;
   a data producer;

one or more data consumers; and a temporal storage manager, wherein the temporal storage manager is configured to:

maintain a producer shadow store containing a plurality of entries in a log-structured logical volume, wherein each entry of the plurality of entries is indicative of a modification of one or more data blocks of the logical storage aggregation by the data producer;

maintain a repository containing a baseline version of the logical storage aggregation; and provide the one or more data consumers read-only access to the producer shadow store.

2. The system as recited in claim 1, wherein the temporal storage manager is further configured to merge an entry of the plurality of entries with the repository.

3. The system as recited in claim 2, wherein the temporal storage manager is further configured to remove a merged entry of the plurality of entries from the log-structured logical volume.

4. The system as recited in claim 1, wherein the temporal storage manager is further configured to provide the one or more data consumers and the data producer with read-only access to the repository.

5. The system as recited in claim 1, wherein each entry of the plurality of entries comprises one or more modified data blocks and an index to the one or more modified data blocks.

6. The system as recited in claim 1, wherein each entry of the plurality of entries contains a timestamp indicative of a time of modification of the one or more data blocks.

7. The system as recited in claim 1, wherein, in response to a read request for a specified block of the logical storage aggregation from a data consumer of the one or more data consumers, the temporal storage manager is configured to:

search the producer shadow store for the specified block;

return a shadow copy of the specified block to the data consumer in response to a detection of the specified block in the producer shadow store;

return a repository copy of the specified block to the data consumer from the repository in response to a detection of an absence of the specified block in the producer shadow store.

8. The system as recited in claim 1, wherein the temporal storage manager is further configured to maintain connection information for a data consumer of the one or more data consumers, wherein the connection information is indicative of a version of the logical storage aggregation being accessed by the data consumer.

9. The system as recited in claim 1, wherein the temporal storage manager is further configured to create one or more archived versions of the logical storage aggregation.

10. The system as recited in claim 1, wherein the temporal storage manager is further configured to create one or more snapshots of the logical storage aggregation.

11. The system as recited in claim 1, wherein the temporal storage manager is further configured to create one or more replicas of the logical storage aggregation.

12. The system as recited in claim 1, further comprising a plurality of nodes forming a cluster, wherein the data producer comprises a plurality of data producer instances including a first data producer instance at a first node of the cluster and a second data producer instance at a second node of the cluster;

wherein the temporal storage manager is further configured to:

maintain a first producer shadow store associated with the first data producer instance at the first node;

maintain a second producer shadow store associated with the second data producer instance at the second node; and exchange coordination messages between the first node and the second node in order to maintain a single consistent image of the logical storage aggregation using a combination of the first and second producer shadow stores.

13. The system as recited in claim 1, wherein, in response to a request for a locally modifiable copy of the logical storage aggregation from a first data consumer of the one or more data consumers, the temporal storage manager is configured to:

initialize a consumer shadow store for the first data consumer, wherein the consumer shadow store is associated with a frozen image of the repository;

and wherein, in response to a request for a local modification of one or more data blocks of the logical storage aggregation from the first data consumer, the temporal storage manager is further configured to:

append a local entry into the consumer shadow store, wherein the local entry is indicative of the local modification by the first data consumer.

14. The system as recited in claim 1, further comprising a plurality of nodes forming a cluster, wherein the temporal storage manager is incorporated at a first node of the cluster, and wherein, in response to a failure, the temporal storage manager is configured to fail over to a second node of the cluster.

15. The system as recited in claim 1, further comprising an intelligent storage device, wherein the intelligent storage device is one of: an intelligent disk array, a virtualization appliance, and a virtualization switch; and wherein the repository is stored at the intelligent storage device.

16. A method comprising:

maintaining a producer shadow store containing a plurality of entries in a log-structured logical volume, wherein each entry of the plurality of entries is indicative of a modification of one or more data blocks of a logical storage aggregation by a data producer;

maintaining a repository containing a baseline version of the logical storage aggregation; and providing one or more data consumers read-only access to the producer shadow store.

17. The method as recited in claim 16, further comprising:

merging an entry of the plurality of entries with the repository.

18. The method as recited in claim 17, further comprising:

removing a merged entry of the plurality of entries from the log-structured logical volume.

19. The method as recited in claim 16, further comprising:

providing the one or more data consumers read-only access to the repository.

20. The method as recited in claim 16, further comprising:

responding to a read request for a specified block of the logical storage aggregation by:

searching the producer shadow store for the specified block;

returning a shadow copy of the specified block in response to a detection of the specified block in the producer shadow store;

returning a repository copy of the specified block from the repository in response to a detection of an absence of the specified block in the producer shadow store.

21. The method as recited in claim 16, further comprising:
maintaining connection information for each of the one or more data consumers, wherein the connection information is indicative of an entry of the logical storage aggregation being accessed by the corresponding data consumer.

22. The method as recited in claim 16, further comprising:
creating one or more archived versions of the logical storage aggregation.

23. The method as recited in claim 16, further comprising:
maintaining a first producer shadow store associated with a first data producer instance at a first node of a cluster;
maintaining a second producer shadow store associated with a second data producer instance at a second node of a cluster; and
exchanging coordination messages between the first node and the second node in order to maintain a single consistent image of the logical storage aggregation using a combination of the first and second producer shadow stores.

24. The method as recited in claim 16, further comprising:
responding to a request for a locally modifiable version of the logical storage aggregation from a first data consumer of the one or more data consumers by initializing a consumer shadow store associated with a frozen image of the repository; and
appending a local entry into the consumer shadow store, wherein the local entry is indicative of a local modification of one or more data blocks of the logical storage aggregation by the first data consumer.

25. A computer-accessible storage medium comprising program instructions, wherein the program instructions are executable to:
maintain a producer shadow store including a plurality of entries stored in a log-structured logical volume, and wherein each entry of the plurality of entries is indicative of a modification of one or more data blocks of a logical storage aggregation by a data producer;
maintain a repository containing a baseline version of the logical storage aggregation; and
provide one or more data consumers read-only access to the producer shadow store.

26. The computer-accessible storage medium as recited in claim 25, further comprising program instructions executable to:
merge an entry of the plurality of entries with the repository.

27. The computer-accessible storage medium as recited in claim 25, further comprising program instructions executable to:
remove a merged entry of the plurality of entries from the log-structured logical volume.

28. The computer-accessible storage medium as recited in claim 25, further comprising program instructions executable to:
provide the one or more data consumers read-only access to the repository.

29. The computer-accessible storage medium as recited in claim 25, further comprising program instructions executable to:
respond to a read request for a specified block of the logical storage aggregation by:
searching the producer shadow store for the specified block;
returning a shadow copy of the specified block in response to a detection of the specified block in the producer shadow store;
returning a repository copy of the specified block from the repository in response to a detection of an absence of the specified block in the producer shadow store.

30. The computer-accessible storage medium as recited in claim 25, further comprising program instructions executable to:
maintain connection information for each of the one or more data consumers, wherein the connection information is indicative of an entry of the logical storage aggregation being accessed by the corresponding data consumer.

31. The computer-accessible storage medium as recited in claim 25, further comprising program instructions executable to:
create one or more archived versions of the logical storage aggregation.

32. The computer-accessible storage medium as recited in claim 25, further comprising program instructions executable to:
maintain a first producer shadow store associated with a first data producer instance at a first node of a cluster;
maintain a second producer shadow store associated with a second data producer instance at a second node of a cluster; and
exchange coordination messages between the first node and the second node in order to maintain a single consistent image of the logical storage aggregation using a combination of the first and second producer shadow stores.

33. The computer-accessible storage medium as recited in claim 25, further comprising program instructions executable to:
respond to a request for a locally modifiable version of the logical storage aggregation from a first data consumer of the one or more data consumers by initializing a consumer shadow store associated with a frozen image of the repository; and
insert a local entry into the consumer shadow store, wherein the local entry is indicative of a local modification of one or more data blocks of the logical storage aggregation by the first data consumer.

* * * * *